US012717490B1

(12) United States Patent
Pang et al.

(10) Patent No.: US 12,717,490 B1
(45) Date of Patent: Aug. 25, 2026

(54) OPTIMIZED METADATA SCHEDULING

(71) Applicant: Dell Products L.P., Round Rock, TX (US)

(72) Inventors: Lixin Pang, Needham, MA (US); Rong Yu, West Roxbury, MA (US); Kevin M. Tobin, Hopedale, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/082,640

(22) Filed: Mar. 18, 2025

(51) Int. Cl.
*G06F 12/00* (2006.01)
*G06F 3/06* (2006.01)

(52) U.S. Cl.
CPC .......... *G06F 3/0613* (2013.01); *G06F 3/0653* (2013.01); *G06F 3/0673* (2013.01)

(58) Field of Classification Search
CPC .... G06F 3/0613; G06F 3/0653; G06F 3/0673; G06F 3/061; G06F 3/0659; G06F 3/0683; G06F 13/1642; G06F 13/1673; G06F 9/3836
See application file for complete search history.

(56) References Cited

U.S. PATENT DOCUMENTS 12,517,683 B1 * 1/2026 Yu .......................... G06F 3/0659
2017/0371787 A1 * 12/2017 Kalyanasundharam ..................... G06F 12/0828
2023/0236759 A1 * 7/2023 Lathrop .................. G06F 3/067 711/147

* cited by examiner

*Primary Examiner* — Shawn X Gu
(74) *Attorney, Agent, or Firm* — Daly, Crowley, Mofford & Durkee, LLP

(57) ABSTRACT

A method for use in a storage system, comprising: placing a write request in an aging queue; waiting until an age of the write request greater than an aging time associated with the aging queue; removing the write request from the aging queue and updating an ordered data structure to include an object that references the write request, the object having an object ID that corresponds to an address that is associated with the write request; retrieving a sequence of object IDs that correspond to objects in the ordered data structure; classifying the sequence into one of at least a sequential pattern category and a random pattern category; generating a hint indicating an outcome of the classification; and setting a duration for which backend (BE) metadata that corresponds to the write request would remain stored in a cache based on the hint.

20 Claims, 17 Drawing Sheets

1002

Ring Buffer (Sequential IO):
[3, 4, 5, 6, 7, 8, 9, 10, 11, 12, 13, 14, 15, 16, 17, 18]

1004

Ring Buffer (Random IO with Repetition):
[7, 3, 12, 7, 9, 5, 11, 3, 14, 8, 2, 10, 6, 4, 1, 13]

1006

Ring Buffer (Random IO):
[12, 5, 8, 3, 14, 7, 2, 11, 6, 9, 1, 15, 4, 10, 13, 16]

1008

Ring Buffer (Random IO with Clusters):
[4, 5, 6, 12, 13, 14, 2, 3, 1, 9, 10, 11, 7, 8, 15, 16]

FIG. 10

OPTIMIZED METADATA SCHEDULING

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for use in a storage system, comprising: placing a write request in an aging queue; waiting until an age of the write request greater than an aging time associated with the aging queue; removing the write request from the aging queue and updating an ordered data structure to include an object that references the write request, the object having an object ID that corresponds to an address that is associated with the write request; retrieving a sequence of object IDs that correspond to objects in the ordered data structure; classifying the sequence into one of at least a sequential pattern category and a random pattern category; generating a hint indicating an outcome of the classification; and setting a duration for which backend (BE) metadata that corresponds to the write request would remain stored in a cache based on the hint.

According to aspects of the disclosure, a system is provided, comprising: a memory; and at least one processor that is operatively coupled to the memory, the at least one processor being configured to perform the operations of: placing a write request in an aging queue; waiting until an age of the write request greater than an aging time associated with the aging queue; removing the write request from the aging queue and updating an ordered data structure to include an object that references the write request, the object having an object ID that corresponds to an address that is associated with the write request; retrieving a sequence of object IDs that correspond to objects in the ordered data structure; classifying the sequence into one of at least a sequential pattern category and a random pattern category; generating a hint indicating an outcome of the classification; and setting a duration for which backend (BE) metadata that corresponds to the write request would remain stored in a cache based on the hint.

According to aspects of the disclosure, a non-transitory computer-readable medium storing one or more processor-executable instructions, which, when executed by at least one processor, further cause the processor to perform the operations of: placing a write request in an aging queue; waiting until an age of the write request greater than an aging time associated with the aging queue; removing the write request from the aging queue and updating an ordered data structure to include an object that references the write request, the object having an object ID that corresponds to an address that is associated with the write request; retrieving a sequence of object IDs that correspond to objects in the ordered data structure; classifying the sequence into one of at least a sequential pattern category and a random pattern category; generating a hint indicating an outcome of the classification; and setting a duration for which backend (BE) metadata that corresponds to the write request would remain stored in a cache based on the hint.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 10 shows an example of different sequence patterns, according to aspects of the disclosure;

DETAILED DESCRIPTION

Figure 1A:
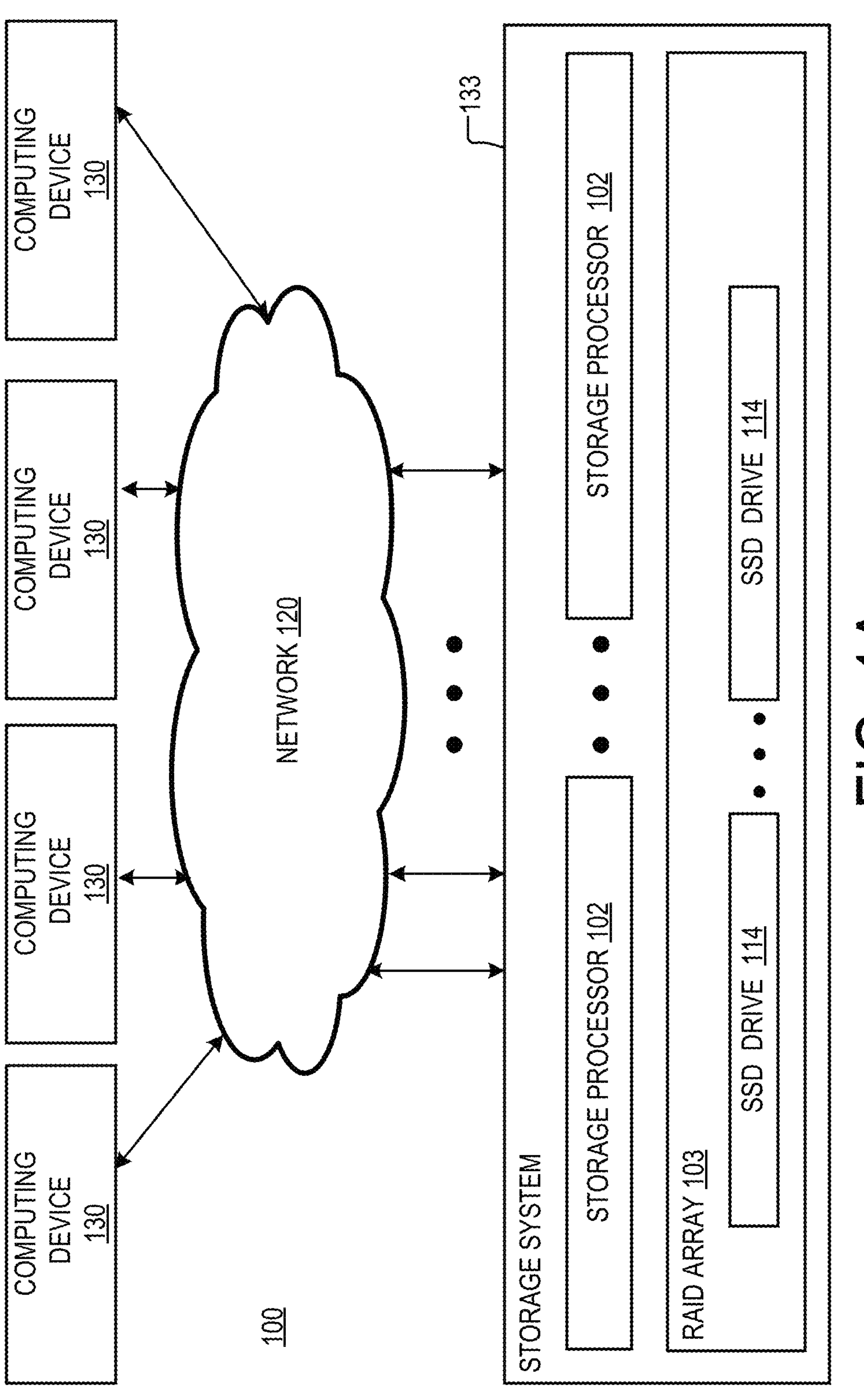
FIG. 1A is a diagram of an example of a system, according to aspects of the disclosure.

FIG. 1A is a diagram of an example of a system 100, according to aspects of the disclosure. As illustrated, system 100 may include a storage system 133 that is coupled to a plurality of computing devices 130 via a communications network 120. Each of the computing devices 130 may include a smartphone, a desktop, a server, a laptop, and/or any other device that might be used by a user to store and retrieve data from the storage system 133. Each of the computing devices may be the same or similar to the computing device 500, which is discussed further below with respect to FIG. 5. The communications network 120 may include one or more of the Internet, a local area network (LAN), a wide area network (WAN), an InfiniBand network, a mobile data network, etc. Storage system 133 may include a plurality of storage processors 102 and a plurality of storage devices 114. In some implementations, each of the storage devices 114 may include a Solid-State Drive (SSD), a Non-Volatile Memory Express (NVME) device, a hard disk, and/or any other suitable type of storage device. According to the present example, the storage devices are arranged in a RAID array 103. Each of the storage processors 102 may include a computing device, such as the computing device 500, which is discussed further below with respect to FIG. 5. Each of the storage processors 102 may be configured to receive I/O requests from the computing devices 130 and execute the received requests by reading or writing data to the RAID array 103.

Figure 1B:
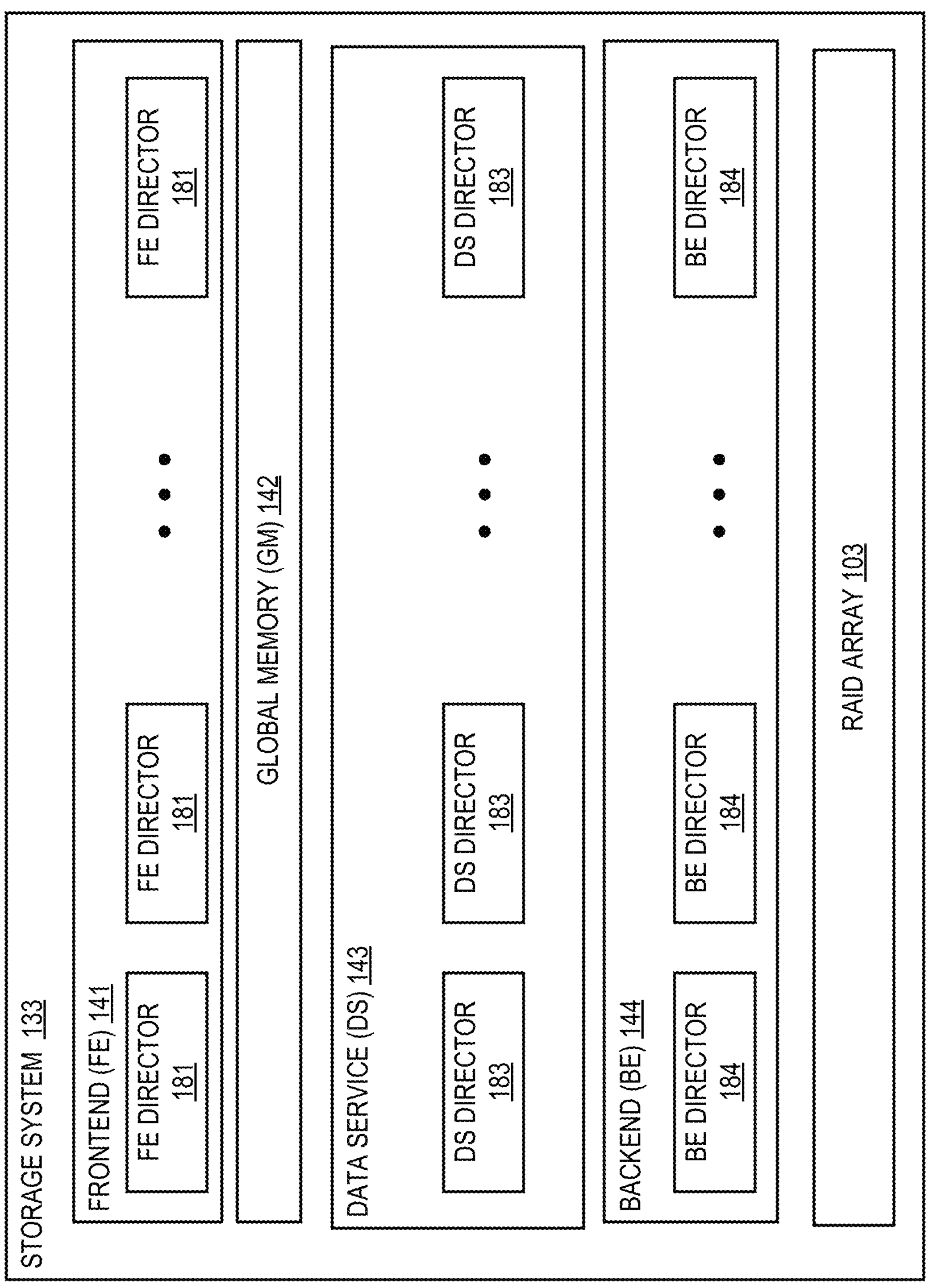
FIG. 1B is a diagram of an example of a storage system, according to aspects of the disclosure.

FIG. 1B is a diagram illustrating aspects of the operation of storage system 133, according to aspects of the disclosure. As illustrated, the storage system 133 may include a frontend (FE) 141, a global memory (GM) 142, a data service (DS) 143, and a backend (BE) 144. FE 141 may be comprised of one or more FE directors 181. Each FE director 181 may include one or more processes that are executed on a respective one of the storage processors 102. DS 143 may be comprised of one or more DS directors 183. Each DS director 183 may include one or more processes that are executed on a respective one of the storage processors 102. BE 144 may be comprised of one or more BE directors 184. Each BE director 184 may include one or more processes that are executed on a respective one of the storage processors 102. GM 142 includes a shared memory space that is used by storage system 133 for caching data. GM 142 may include a plurality of memory portions that are united in the same address space, wherein each of the plurality of memory portions is part of the volatile memory (e.g., DRAM) of a different respective one of the storage processors 102. Although, in the present example, GM 142 is used to cache data, it will be understood that alternative implementations are possible in which GM 142 is replaced with a different type of cache memory. In other words, the present disclosure is not limited to using any specific type of cache memory.

Figure 1C:
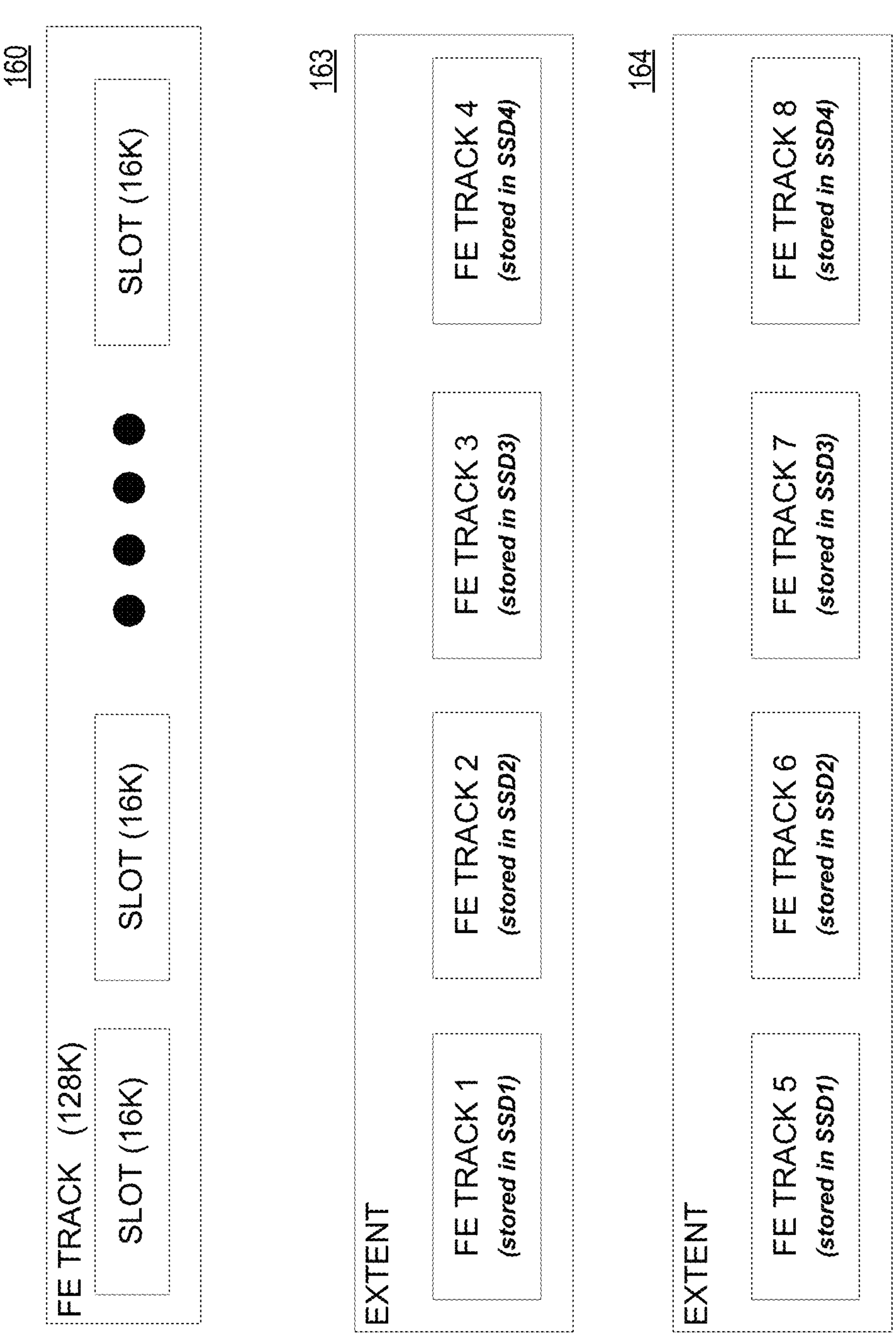
FIG. 1C is a diagram of an example of different units of data storage, according to aspects of the disclosure.

FIG. 1C shows an example of an FE track 160. The term "frontend track" as used throughout the disclosure refers to a data block, or a unit of data storage, in which data is cached into the GM 142. According to the present example, the FE track 160 is 128K in size and it consists of a plurality of slots that are each 16K in size. However, in an alternative implementation, the FE track 160 may have a mix of 64K and 16K slots. Stated succinctly, the present disclosure is not limited to any specific implementation of the FE track 160 and/or the slots that form the FE track. The term "slot" as used herein refers to a smaller unit of data storage that is part of an FE track. Further shown in FIG. 1C are extents 163 and 163. Extent 163 includes FE tracks 1-4 and extent 164 includes FE tracks 5-8. As used herein, the term "extent" refers to a set of sequential FE tracks (i.e., FE tracks having sequential addresses). According to the present example, any of FE tracks 1-8 is the same or similar to FE tack 160.

Figure 1D:
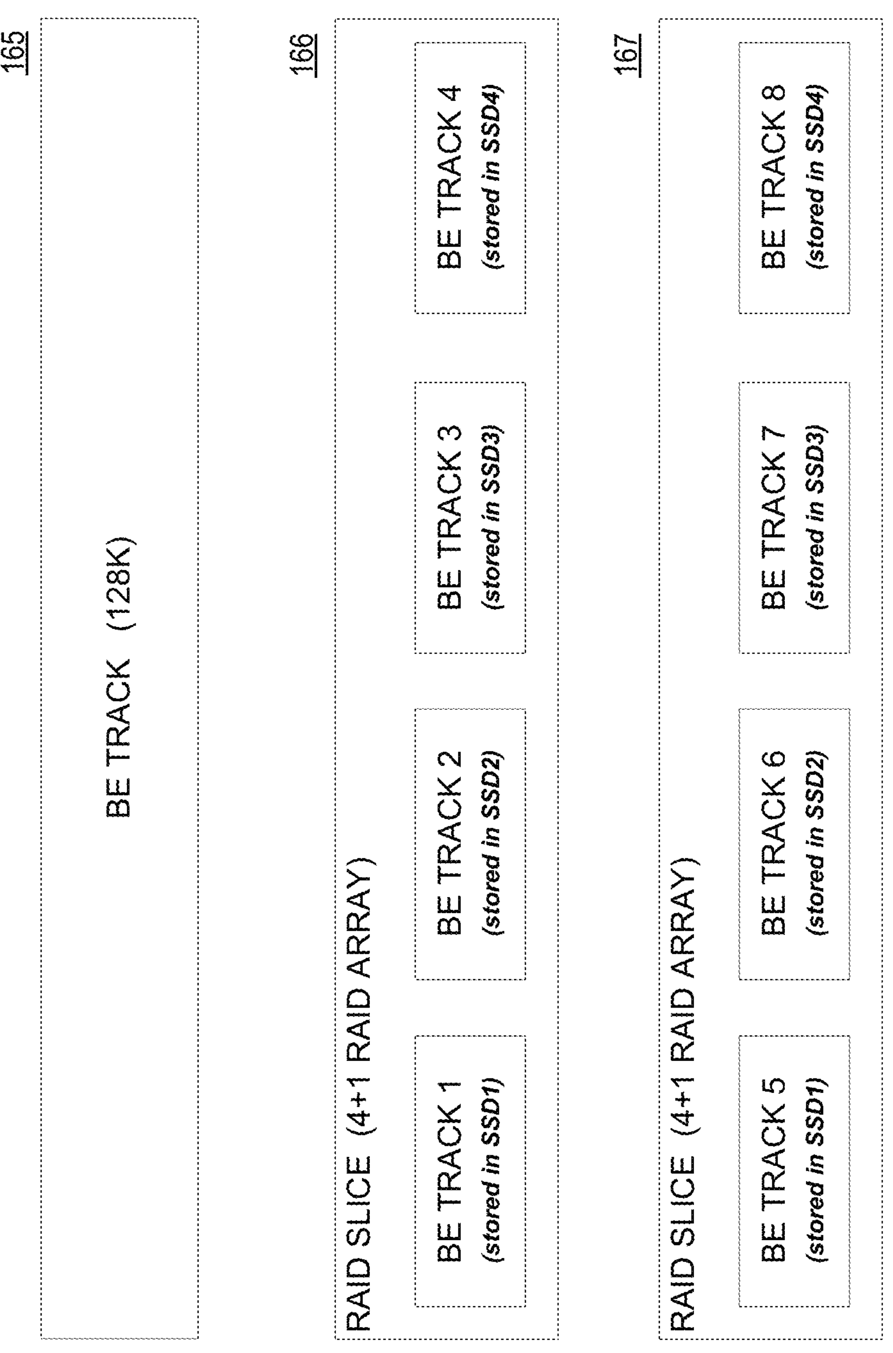
FIG. 1D is a diagram of an example of different units of data storage, according to aspects of the disclosure.

FIG. 1D shows an example of a BE track 165. The term "backend track" as used throughout the disclosure refers to a data block, or a unit of data storage, in which data is stored in the RAID array 103. According to the present example, the BE track 165 is 128K in size. However, the present disclosure is not limited to any specific implementation of the BE track 165. According to the present example, the BE track 165 is not divided into slots as is the case with the FE track 160, which is discussed above with respect to FIG. 1C. However, the present disclosure is not limited thereto, and in some implementations, the BE track 165 may be divided into slots. Stated succinctly, the present disclosure is not limited to any specific implementation of the BE track 165. The term "slot" as used herein refers to a smaller unit of data storage that is part of a BE track. Further shown in FIG. 1D are RAID slices 166 and 167. RAID slice 166 includes BE tracks 1-4 and RAID slice 167 includes BE tracks 5-8. As is well-known in the art, the term "RAID slice" refers to a logical segment or partition of storage within a RAID array. Although, the example of FIG. 1D assumes a 4+1 RAID array, it will be understood that the present disclosure is not limited to any specific type of RAID configuration. Furthermore, it will be understood that the present disclosure is not limited to any specific size of the FE tracks and the BE tracks that are used by storage system 133. The mapping between BE tracks and corresponding RAID slices may be established by a data structure that is stored in the memory of one or more storage processors 102 or elsewhere in storage system 133. The mapping may be static or it may change from time to time. The present disclosure is not limited to any specific method for implementing the mapping. Furthermore, according to the present example, each of the FE tracks is given a unique address that belongs to a frontend track address space maintained at FE 141 and each of the BE tracks is given a unique address that belongs to a backend track address space that is maintained at BE 144.

Figure 1E:
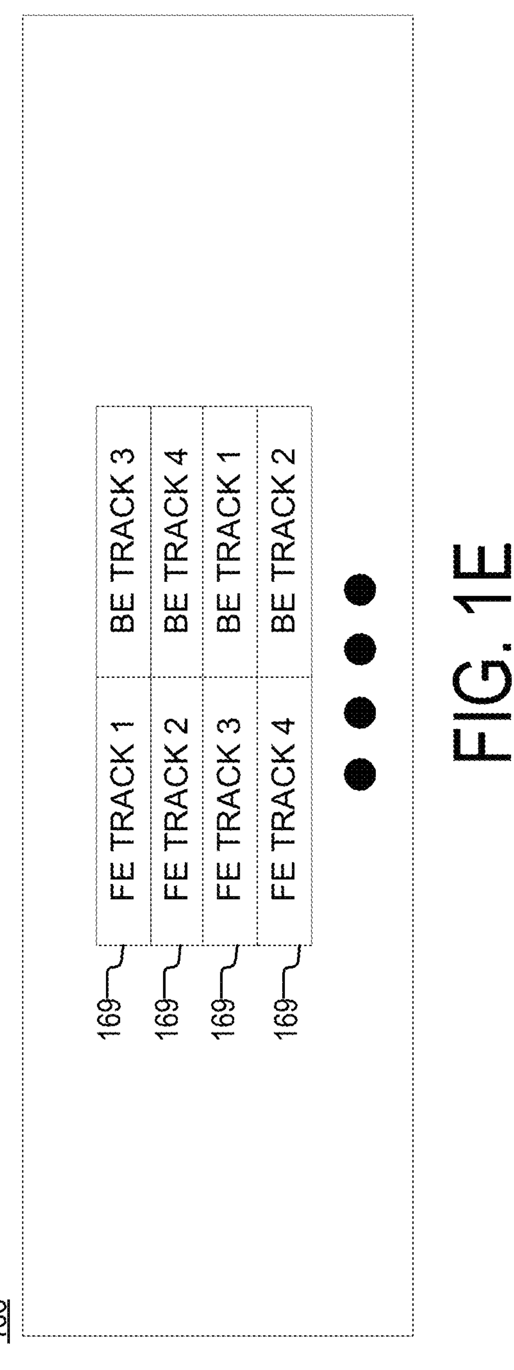
FIG. 1E is a diagram of an example of a data structure, according to aspects of the disclosure.

FIG. 1E is a diagram of an example of a data structure 168, according to aspects of the disclosure. According to the present example, data structure 168 includes a plurality of entries 169. Each entry 169 includes an identifier (e.g., an address) of a respective FE track in GM 142 and an identifier (e.g., an address) of a respective backend track. In other words, data structure 168 is a map that maps each of the plurality FE tracks in GM 142 to a different corresponding one of the backend tracks. The data structure 168 may be stored in the memory of one or more of storage processors 102 and/or elsewhere in the storage system 133. The present disclosure is not limited to any specific implementation of data structure 168. Data structure 168 may be implemented as a single file, a plurality of files, a single database object, a plurality of database objects, and/or in any other suitable manner. Further information about the architecture shown in FIGS. 1A-E can be found in U.S. patent application Ser. No. 18/820,867, entitled INTELLIGENT RELOCATION DESTAGE, which is hereby incorporated by reference herein in its entirety.

Figure 1F:
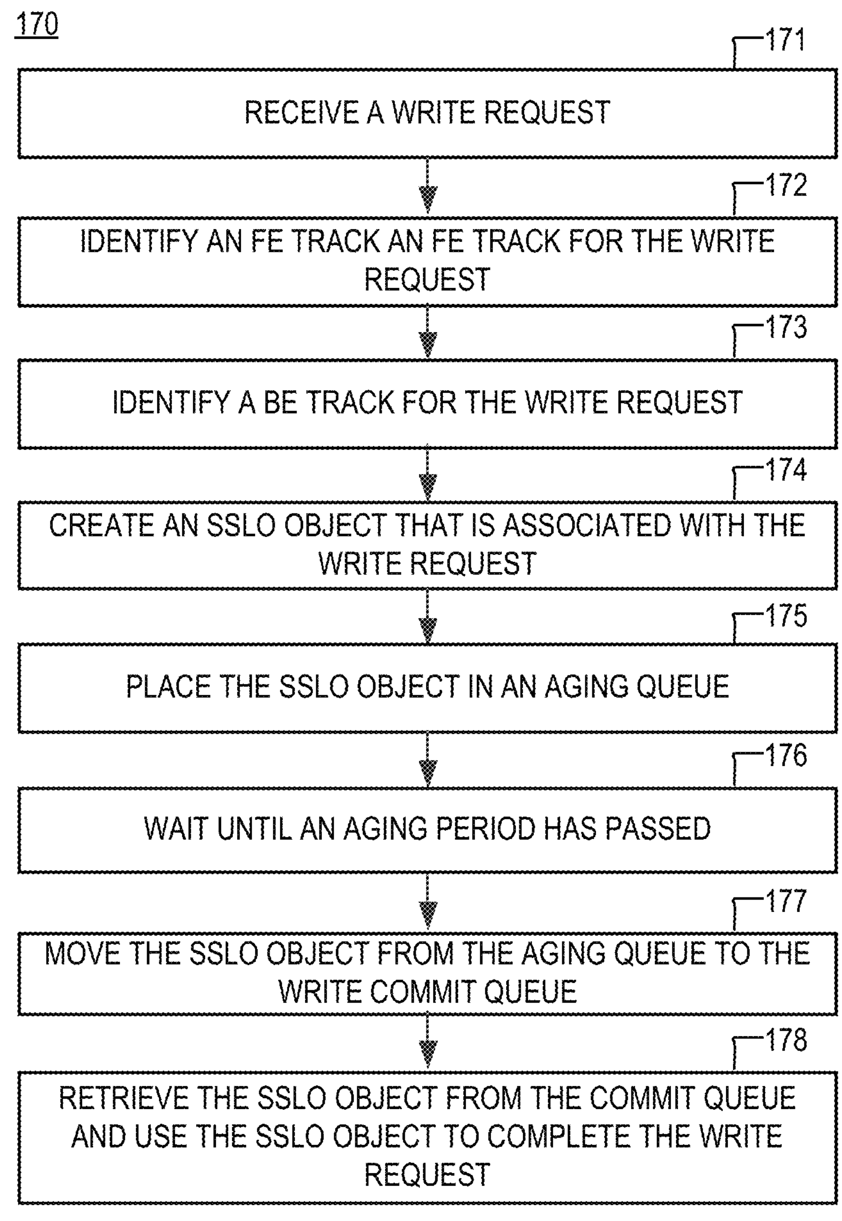
FIG. 1F is a flowchart of an example of a process, according to aspects of the disclosure.

FIG. 1F is a flowchart of an example of a process 170, according to aspects of the disclosure. According to the present example, process 170 is executed by storage system 133. At step 171, storage system 133 receives a write request. At step 172, storage system 133 identifies an FE track for the write request. The FE track may include user data for the write request (received at step 171) and/or metadata for the write request (e.g., a hash digest of the user data, etc.), as well as for other write requests. At step 173, storage system 133 identifies a BE track for the write request. The BE track may include various mappings that are used in identifying the physical location in RAID array 103 where the user data is going to be destaged. At step 174, storage system 133 creates an SSLO object for the write request. The SSLO object may include a pointer to the FE track for the write request, and/or any other information (or pointers to information) that is needed for executing the write request. In one particular example, the SSLO object may include bit mask, which is also referred to as an SSLO object mask. Each bit mask may correspond to a different FE track in storage system 133. When any of the bits has a first value (e.g., '1 this may be an indication that the bit's corresponding FE track is associated with (i.e., pointed to) by the SSLO object. When any of the bits has a second value (e.g., ''0'), this is an indication that the bit's corresponding FE track is not associated (or pointed to) by the SSLO object. When the SSLO object is destaged, the bits in the mask may be translated to FE track mapping and/or BE track mapping. As used throughout the disclosure, the phrase "object points to a track (e.g., a BE track or an FE track)" shall mean that the object includes an identifier of the track and/or other information that references the track (directly or indirectly), which can be used to identify the track. At step 175, storage system 133 places the SSLO object in an aging queue. At step 176, storage system 133 waits until a predetermined aging period has passed. After the aging period has passed, at step 177, storage system 133 removes the SSLO object from the aging queue and stores the SSLO object in a write commit queue. At step 178, storage system 133 retrieves the SSLO object from the write commit queue and uses the SSLO object to complete the write request. Using the SSLO object to complete the write request may include using the SSLO object to identify or retrieve information associated with the write request, and using the information to store the user data associated with the write request into the RAID array 103. As noted above, in some implementations, a bit mask that is available in the SSLO object may be used to identify BE tracks that are associated with the SSLO object. In some respects, all write requests associated with the SSLO object may be destaged to the RAID array 103 as part of the same operation (or sequence of operations).

FIG. 1A-F are provided to illustrate one example of different data structures that are used to store metadata for completing a write request. Specifically, FIGS. 1A-F illustrate that user data corresponding to write requests (i.e., the data that is requested to be written) is stored in FE tracks, while various mappings (or portion thereof) which describe a relationship between the FE track and the physical location where the user data is to be stored are stored in a BE track. FE and BE tracks are pre-allocated, and they are always available to receive information (provided that they are not currently assigned to a pending write request).

However, in order for an FE track and/or a BE track to be assigned to an incoming write request, metadata associated with the FE and BE tracks needs to be retrieved. In Dell PowerMax™, the FE track metadata is referred to by the acronym FE TID, and the BE track metadata is referred to by the acronym BE TID. For example, and without limitation, the FE TID for a particular FE track may include virtual provisioning information (VPI), such as a cache slot, sector signature, version number, and a BE track number that corresponds to the FE track. For example, the BE TID for a BE track may include information that is needed when SSLO objects are taken out of the write commit queue for a write destage to a disk, such as an initialization state and sector signatures.

Figure 2:
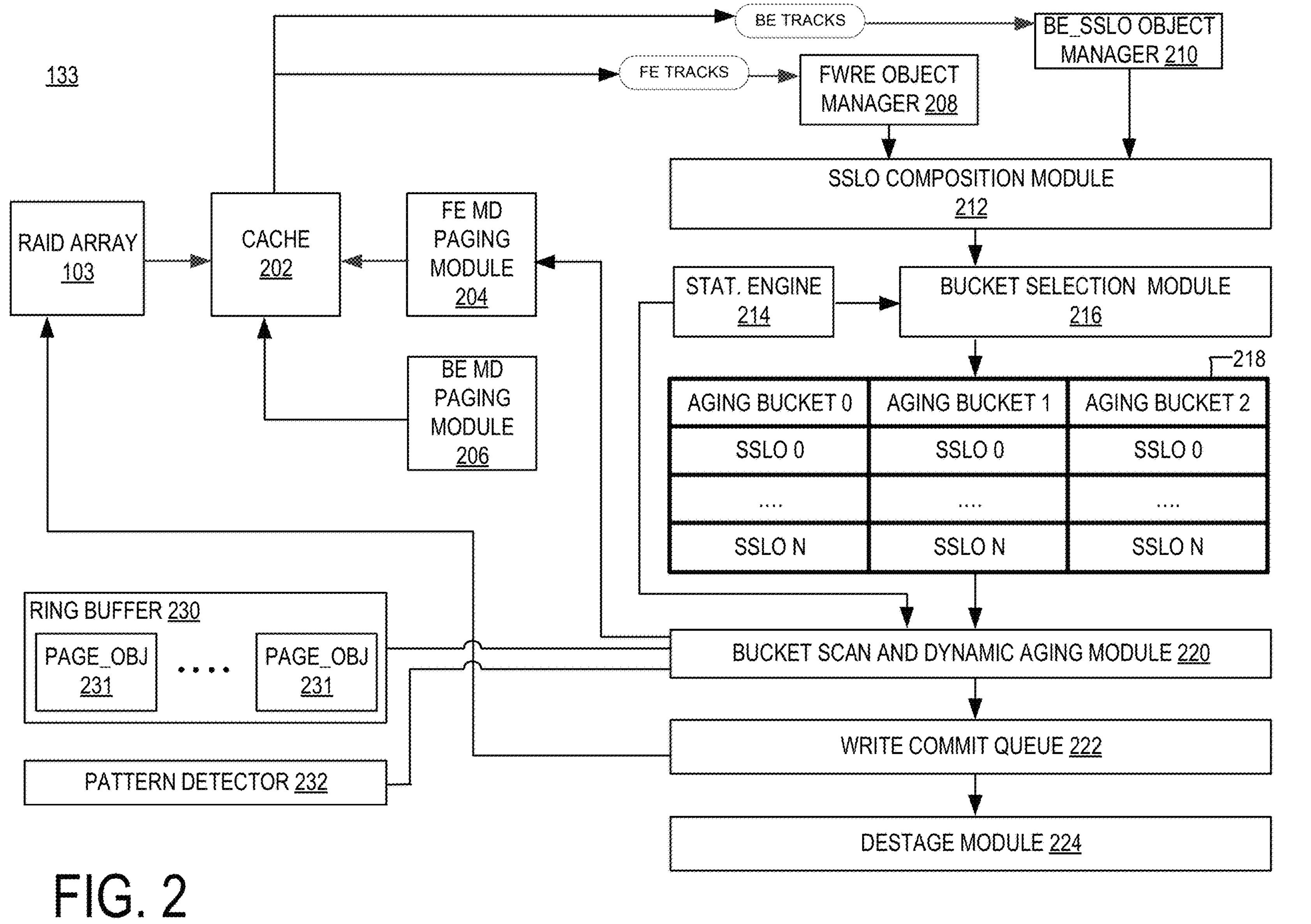
FIG. 2 is a diagram of an example of a configuration of the storage system of FIG. 1B, according to aspects of the disclosure.

In general, the FE TID for an FE track needs to be obtained before an FE track can be used to store user data and/or metadata for an incoming write request. The FE TID may be either cached (e.g., in cache 202 which is shown or in FIG. 2) or it may be stored in a permanent storage (e.g., in RAID array 103 which is shown in FIGS. 1B and 2B). When a write request is being executed, a page of FE TIDs may be brought from the RAID array 103 and stored in GM 142 (or cache 202), provided that it is not already available in cache. Next any necessary FE TID metadata may be retrieved from the page. After the FE TID is retrieved, it may be used in storing user data and/or metadata in the FE track and/or to subsequently utilizing the FE track to complete the write request. And finally, any updates to the FE TID may be propagated by storing the page in the RAID array 103, eventually.

Similarly, the BE TID for a BE track needs to be obtained before an BE track can be used to store user data and/or metadata for an incoming write request. The BE TID may be either cached (e.g., in cache 202 which is shown or in FIG. 2) or it may be stored in a permanent storage (e.g., in RAID array 103 which is shown in FIGS. 1B and 2B). When a write request is being executed, a page of BE TIDs may be brought from the RAID array 103 and stored in GM 142 (or cache 202), provided that it is not already available in cache. Next any necessary BE TID metadata may be retrieved from the page. After the BE TID is retrieved, it may be used in storing data in the BE track and/or to subsequently utilizing the BE track to complete the write request. And finally, any updates to the BE TID may be propagated by storing the page in the RAID array 103, eventually.

It will be understood that FE TID is only one possible example of frontend metadata. However, it will be understood that the present disclosure is not limited to any specific type of frontend metadata being used. It will be understood that BE TID is only one possible example of backend metadata. However, it will be understood that the present disclosure is not limited to any specific type of backend metadata being used.

FIG. 1F is provided to illustrate the concept of aging. In very rough terms, the idea of aging involves waiting for a certain amount of time, after everything (or at least some of everything) is in place to complete the write request, before completing the write request. In the present example, a write request is aged after the FE track for the write request are completed and before the BE track for the write request is completed. In other words, the FE metadata for a write request needs to be fetched before a write request is aged (e.g., before an SSLO object corresponding to the write request is created and placed in tan aging queue, such as aging queue 218), while the BE metada for the same write request need to be fetched after the write request is aged (e.g., after the SSLO object corresponding to the write request is removed from the aging queue and placed in a write commit queue, such as the queue 222). Put differently, in order for an SSLO object be placed in an aging queue (e.g., in aging queue 218 shown in FIG. 2), only FE TID metadata is required while no BE TID metadata is required (it will be recalled that the TID may include an BE track identifier which is sufficient to initialize the SSLO object). In this regard, as is discussed further below aging time can be increased temporarily, during periods of high system load, to reduce paging activity that is associated with BE TID metadata, which in turn allows for an increase in paging activity associated with FE metadata. As can be readily paging activity associated with FE TID metadata involves bringing in FE TID metadata from permanent storage to cache and paging activity associated with BE TID metadata involves bringing in BE TID metadata from permanent storage to cache.

The utility of aging is in that it makes storage system 133 more efficient in situations in which the same logical block address (or same FE track) is written to multiple times in close succession. For example, when write requests are received in close succession, if no aging is used, the metadata and user data associated with the write requests would be written repeatedly to the RAID array 103. However, because accessing the RAID array 103 is slower than accessing the cache of storage system 133 (e.g., GM 142), the efficiency of the system will be decreased. By contrast, when aging is used, the updates to the logical block address can be handled by updating data in cache (e.g., GM 142), with only the final write request in the sequence being committed to the RAID array 103. In other words, because accessing cache is faster and accessing the RAID array 103, the use of aging improves the efficiency of the storage system 133 in situations in which the same LBA or same FE track experiences a burst of writes. In the example of FIG. 1F, the aging is performed by placing the SSLO object into an aging queue and waiting for a particular aging period before moving forward.

In other words, the execution of write requests involves paging FE and BE metadata into GM 142, and paging FE and BE metadata in and out of GM 142. The capacity of GM 142 may be limited. When GM 142 becomes full, the performance of storage system 133 may be significantly degraded. In this regard, the longer write requests are aged for, the greater the likelihood that GM 142 (or another cache) would become full. Stated succinctly, the use of aging can increase the efficiency of a storage system, but it also increases the likelihood that the cache of the storage system will become full. The discussion that follows presents an improved method and system for aging of write requests which balances these considerations.

FIG. 2 is a schematic diagram illustrating an example of a possible configuration of storage system 133 which implements the improved method and system for aging, according to aspects of the disclosure. Shown in FIG. 2 are the RAID array 103, a cache 202, a FE MD paging module 204, a BE MD paging module 206, an FE write request object (FWRO) manager 208, a BE_SSLO object manager 210, an SSLO composition module 212, a statistics engine 214, a bucket selection module 216, an aging queue 218, a bucket scan and dynamic aging module 220, and a write commit queue 222.

The aging queue 218 may include a plurality of buckets. Each bucket may be a data structure that is used to store service-level symmetric link objects (SSLOs), or another type of object, which is used to execute or otherwise track pending write requests. In one example, the aging queue 218 may be implemented as an array (or linked list) of objects (e.g., bucket), wherein each object is configured to encapsulate a data structure used to implement a given bucket and an indication of an aging time for the given bucket. In this example, the aging time of the given bucket is the time an SSLO object (or another type of object) must spend in the given bucket before being transferred to the write commit queue 222.

Module 220 may be configured to retrieve SSLO objects from the aging queue 218 and store the SSLO objects in the write commit queue. Module 220 may be configured to examine the buckets of aging queue 218 in a sequence. For each bucket, module 220 may recalculate the aging time of the bucket, determine the age of the SSLO objects in the bucket, and transfer, to the write commit queue 222, all SSLO objects in the bucket whose age is greater than the bucket's aging time. The age of an SSLO object is the time that the SSLO object has spent in the bucket. In some implementations, the buckets may be examined in a round-robin fashion, but the present disclosure is not limited thereto. Although, in this example, the aging time of each bucket is recalculated every time before the bucket is examined, the present disclosure is not limited thereto. In some implementations, the aging time of any of the buckets in aging queue 218 may be updated repeatedly over the course of its use in accordance with a different pattern. For example, the aging time of any of the buckets in aging queue 218 may be updated every 5 minutes. As another example, the aging time of any of the buckets in aging queue 218 may be updated every time the current load of storage system 133 (or portion thereof) crosses one of a plurality of thresholds. In some implementations, module 220 may execute a process 400, which is discussed further below with respect to FIG. 2. By way of example, and without limitation, updating the aging time of a bucket may include retrieving a bucket object that is used to implement the bucket and changing the value of variable inside the object which corresponds to the aging time of the bucket.

Module 220 may be configured to perform prefetching BE metadata and/or any other metadata that needs to be prefetched before a write request is completed. As noted above, module 220 may examine each bucket in aging queue 218 (e.g., in a round-robin fashion). For each bucket, module 220 may determine the respective age of each of the SSLO objects in the buckets. Furthermore, for each SSLO object, module 220 may determine whether to prefetch the BE metadata and/or other metadata that is associated with the SSLO object. According to the present example, BE metadata is associated with an SSLO object if: (i) the SSLO object points to an FE track that is associated with the BE metadata, (ii) the SSLO object points to a BE track that is associated with the BE metadata, and/or (iii) if the SSLO objects points to an FE track that contains user data or metadata that corresponds to the same write request(s) as the BE metadata. To determine whether BE metadata needs to be prefetched for a given SSLO object, module 220 may determine if the age of the given SSLO object satisfies a predetermined condition. If the predetermined condition is satisfied, module 220 may load the BE metadata that corresponds to the given SSLO object from RAID array 103 into cache 202. If the condition is not satisfied, module 220 may revisit the SSLO object the next time the bucket is examined.

The write commit queue 222 is a data structure where SSLO objects are placed when they have aged out of the aging queue 222. In general, after the SSLO object is placed in the write commit queue, data associated with the SSLO object's corresponding write requests is stored in RAID array 103 (e.g., see step 178 of process 17).

The benefits of using pre-fetching are now described in further detail. In general, once an SSLO object is placed in the write commit queue 222, the write requests associated with the SSLO object are ready to be completed. However, in order for the write requests to be completed, BE metadata might need to be retrieved first. If the BE metadata is not already cached, the BE metadata would need to be fetched into cache 202 from RAID array 103. However, because fetching into cache data from RAID array 103 or other permanent storage could be time consuming, not having the BE metadata in cache by the time the SSLO object placed into the write commit queue 222 could impart a considerable delay on the completion of the write requests. In this regard, as can be readily appreciated, the prefetching of BE metadata may increase the speed at which write requests are completed by storage system 133 and therefore improve the overall response time of storage system 133. In some implementations, the prefetching of BE metadata may be performed in accordance with a process, which is discussed further below with respect to FIG. 6. Additionally or alternatively, the prefetching of metadata may be performed in accordance with a process 700, which is discussed further below with respect to FIG. 7.

Cache 202 may be a portion of GM 142 where pages of metadata (e.g., FE metadata (MD) and BE MD) are brought in from RAID array 103. Cache 202 may also store user data associated with write requests that are pending at storage system 133. Additionally or alternatively, cache 202 may store FE tracks and BE tracks that are initialized in storage system 133.

Module 204 may be configured to bring in pages of BE metadata from RAID array 103 into cache 202. Furthermore, module 204 may be configured to replace pages of FE metadata that are currently stored in the object store. The replacement may be performed in accordance with a least recently used (LRU) algorithm and/or any other similar algorithm.

Module 206 may be configured to bring in pages of BE metadata from RAID array 103 into Cache 202. Furthermore, module 206 may be configured to replace pages of BE metadata that are currently stored in the object store. The replacement may be performed in accordance with a least recently used (LRU) algorithm and/or any other similar algorithm.

In some implementations, module 206 may be configured to record the fall-through time of cache 202 and report the recorded fall-through time to module 220. The fall-through time may be the maximum amount of time for which BE metadata is allowed to remain stored in cache 202 before being replaced. Alternatively, the fall-through time may be the amount of time that the BE metadata would be allowed to remain in cache 202 before being replaced by the replacement algorithm in use, given the current state of cache 202 and/or storage system 133. In some implementations, the fall-through time may be determined by: (i) identifying a plurality of BE metadata items (e.g., BE TIDs), where each of the BE metadata items corresponds to a different write request, and each of the BE metadata items was stored in cache 202 (ii) identifying the respective time which each of the BE metadata items has spent in cache 202 before being removed from cache 202, and (iii) taking the average of the times determined at step (ii). Although, in the present example, the fall-through time of cache 202 is equal to (or otherwise based on) the average of the respective times each of a plurality of BE metadata items have spent in cache 202, alternative implementations are possible in which the fall-through time is equal to (or otherwise based on) the mean of the respective times each of the plurality of BE metadata items have spent in cache 202, and/or any other statistical property of the times determined at step (ii), such as weighted average, mean, maximum, etc. Although, in the present example, the fall-through time of cache 202 is calculated exclusively based on the respective times which BE metadata items have spent in cache 202, alternative implementations are possible in which the fall-through time of cache 202 is determined based on respective times FE metadata items (e.g., FE TIDs) or other data or metadata have spent in cache 202 before being removed from cache 202. In some implementations, the plurality of BE metadata items may include only metadata items stored in cache 202 during a particular time window (e.g., in the last 15 minutes). In some implementations, module 206 may be configured to maintain and update a data structure that identifies the respective time each BE metadata item (or another data item such as an FE metadata item) is stored in cache 202 and the respective time the BE metadata item (or other data item) is removed from cache 202. In other words, for each BE metadata item (or other data item) that is brought in cache 202, the data structure may include a timestamp of when the BE metadata item or other data item is stored in cache 202 and a respective timestamp of when the BE metadata item or other data item is removed from cache 202 (provided that it has been removed already). The timestamps in the data structure may be used to determine the duration for which different BE metadata items and/or other data items remain in cache 202 before being replaced.

Manager 208 may be configured to generate and manage frontend write request objects (FWRO). Each FWRO object may represent (or reference) a corresponding FE track. Manager 208 may further include a binary tree or another data structure where the FWRO objects are stored. In one example, each of the FWRO object may serve as a handle for one of the FE tracks in storage system 133.

Manager 210 may be configured to generate BE_SSLO objects. Each BE_SSLO object may represent (or otherwise reference) a different BE track. Manager 210 may further include a binary tree or another data structure where the BE_SSLO objects are stored. In one example, each of the BE_SSLO object may serve as a handle for one of the BE tracks in storage system 133.

Module 212 may be a module that is configured to combine FWRO and BE_SSLO objects into SSLO objects. Each SSLO object may include pointers to or otherwise reference one or more FWRO objects and one or more BE_SSLO objects. For each FWRO that is included in an SSLO object, the same SSLO object may include the BE_SSLO object that corresponds to the FWRO object. As discussed above a BE track corresponds to one or more FE tracks (e.g., see FIGS. 1D-E). Thus, a BE_SSLLO object corresponds to an FWRO object when the BE_SSLO object's BE track corresponds to the FWRO object's FE track. An FE track corresponds to a BE track when both the BE track and the FE track contain data (e.g., metadata and/or user data) associated with the same write request. The phrase "user data associated with a write request" refers to the data that is required to be written by the write request.

Engine 214 may be configured to obtain the values of various dynamic properties of runtime system resources of storage system 133 and provide the values to modules 216 and 220, where they are used to select the respective bucket that is to receive individual FWRO objects and adjust the aging time of the buckets in the aging queue 218. In one example, engine 214 may be configured to obtain the values of parameters 1-5, which are discussed further below, and provide the values to bucket selection module 216. Additionally or alternatively, in one example, engine 214 may be configured to obtain the values of parameters A-E, which are discussed further below, and provide the values to module 220.

Module 216 may be configured to receive SSLO objects that are generated by module 212 and store the SSLO objects in the aging queue 218. Specifically, for each received SSLO object, module 216 may use one or more of parameters 1-5 as a basis for selecting one of the buckets in aging queue 218, after which module 216 may store the SSLO object in the selected bucket. In some implementations, module 216 may be configured to execute a process 300, which is discussed further below with respect to FIG. 3.

Module 224 may be configured to retrieve SSLO objects from write commit queue 222 and destage the write requests that are associated with each retrieved SSLO object into RAID array 103. Destaging any of the write requests may involve writing user data that is associated with the write request into RAID array 103. The destaging may be performed based on user data or other metadata that is associated with the write request.

In some implementations, module 224 may be configured to record the length of the destage execution window of storage system 133 and report it to module 220. The length of the destage execution window of storage system 133 may be any measure of how long it takes to write the user data of a write request to RAID array 103 after the SSLO object corresponding to the write request has been removed from aging queue 218 and placed in write commit queue 222. In other words, the length of the destage execution window of storage system 133 may be equal to (or otherwise based on) the delay between a write request (or the write request's corresponding SSLO object) being removed from aging queue 218 and the write request being completed. In one example, the destage execution window of storage system 133 may be determined by: (A) identifying a plurality of write requests that were destaged during a particular time window (e.g., in the last 15 minutes), (B) determining how long it took to write the user data of each of the write requests to RAID array 103 after the write request (or its corresponding SSLO object) was removed from aging queue 218, and (C) taking the average of the determined times. Although, in the present example, the length of the destage execution window is determined based on the average of the times determined at step (B) alternative implementations are possible in which the length of the destage window is determined based on another statistical property of the times, such as their mean, weighted average, maximum, and so forth. In some implementations, module 224 may be configured to maintain and update a data structure that identifies the respective time each SSLO object in queue 218 is removed from queue 218 (or placed in write commit queue 222) and the respective time each of the write requests associated with the SSLO object is completed. The data structure may include a plurality of entries, each entry may correspond to a different write request, each entry may include a first timestamp indicating when the write request's SSLO object was removed from aging queue 218 and a second timestamp indicating when the user data corresponding to the write request was written to RAID array 103. The data structure may be used to determine the times discussed above with respect to step (B).

A non-limiting example is now provided of parameters that can be collected or otherwise obtained by engine 214. Specifically, engine 214 may be configured to identify one or more of the following parameters:

Parameter 1—FWRO hot/cold level: This parameter identifies the likelihood that the FE track corresponding to a given FWRO object would be modified during the predetermined time window that starts at a current instant and ends in the future. An FE track may contain data associated with one or more write requests. Each of the write requests corresponds to a particular logical block address (LBA) where user data is being requested to be stored. The FWRO hot/cold level may be equal to otherwise based on the rate at which the LBAs would be modified during the time window and/or another event will happen that would necessitate a modification of the information stored in the FE track. The probabilities or rates of modification for individual LBAs may be determined by using a predictive machine learning (ML) model, that is similar to the model described in U.S. patent application Ser. No. 18/889,501, entitled Activity-Based Metadata Paging, which is herein incorporated by reference in its entirety. The present disclosure is not limited to any specific mode for load prediction. Alternatively, this parameter may be equal to or otherwise determined based on parameter 2. For example, parameter 1 may be determined by scaling parameter 2 based on the ratio of the current load of storage system 133 and the load experienced by storage system 133 during the period for which parameter 2 is calculated.

Parameter 2—FWRO update frequency: This parameter identifies the rate at which the FE track associated with a given FWRO object was modified (or updated) during a predetermined past period. As noted above, the FWRO object may be associated with pending write requests that attempt to store data at LBAs. In this regard, this parameter may be calculated based on the average of the frequency at which each individual one of the LBAs is modified and/or the frequency at which other events occur that require modification of the FE track.

Parameter 3—Number of FE tracks in the SSLO object: This parameter refers to the count of FE tracks (or FWRO objects) that are pointed to by the SSLO object.

Parameter 4:—SSLO MD miss rate: This parameter measures the number of cache misses associated with the SSLO object. As can be readily appreciated, when a write request is received, storage system 133 would attempt first to find in cache 202 the metadata corresponding to the write request (or page where the metadata would be stored). If the metadata and/or page is not available in cache 202, a cache miss will be generated. Furthermore, as noted above, a given SSLO may be associated with a plurality of write requests (which may correspond to the same or different FWRO objects/FE tracks that are referenced by the SSLO object). In this regard, this parameter may be equal to the percentage or number of the write requests associated with the SSLO object which have generated by a page miss. As can be readily appreciated, the complement of MD miss is MD hit rate. In this regard, MD hit rate may be used instead of MD miss provided that the necessary modifications are made. Those of ordinary skill in the art will readily recognize, after reading the present disclosure, what modifications would need to be made.

Parameter 5—SSLO IO pattern: This parameters indicates whether the write requests associated with an SSLO object are part of a sequential write pattern or a random pattern. For example, the write requests may be considered part of a sequential pattern if there exists a subset of the write requests, which has a predetermined size (e.g., 75% or 95%), whereby the LBA (or a physical address) of each write request in the subset is separated by no more than 2 (or another number) of places from the LBA (or a physical address) of at least another one of the write requests in the subset. In general, an SSLO object may be regarded as having a sequential write pattern if the write requests corresponding to the SSLO object write to the same region of a logical unit (or to the same region of RAID array 103). If an SLLO object does not have a sequential write pattern, the SSLO may be regarded as having a random pattern. This parameter may have one value when the write pattern of an SSLO object is random, and another value when the write pattern is sequential. The present disclosure is not limited to any specific criteria for detecting whether the write pattern of the write requests associated with an SSLO object is sequential or random.

Parameter A—Hit rate associated with incoming write requests: This parameter indicates the frequency at which a cache hit is generated when storage system 133 attempts to retrieve from cache 202 the metadata associated with a pending write request (or the page where the metadata would be stored). The complement of this parameter would be "miss rate associated incoming write requests. In this regard, the cache hit and cache miss rates may be determined interchangeably, provided that simple adjustments are made.

Parameter B—MD page-in time of storage system 133: This parameter indicates the time (e.g., average or mean time, etc.) that it takes for storage system 133 to load metadata (or a page) from RAID array 103 into cache 202.

Parameter C—System write-pending (WP) level: This parameter indicates the number write requests that have been received at storage system 133 which have not yet been destaged to permanent storage (or which have not been yet fully completed). Although in this example, parameter C is WP level, alternative implementations are possible in which the parameter C may be any other measure of the load on storage system 133 or portion thereof. The phrase "load on a portion of storage system 133" may refer to the rate at which write requests are received for a particular logical unit or group of logical units.

Parameter D—Bucket number: This parameter identifies the number of a bucket whose aging time is being updated and is used in calculating the updated aging time for the bucket. In some implementations, the respective bucket number that is assigned to each of the buckets in aging queue 218 may be used to reference the bucket. Furthermore, the bucket number may be used to indicate a relative priority of the bucket. The priority of the bucket corresponds to the aging time of the bucket. As is discussed further below, the aging time of a bucket may depend on a variety of factors, in addition to the number of the bucket. However, all else held equal, higher bucket priority will correspond to a lower aging time for the bucket, and a lower bucket priority will correspond to a higher aging time for the bucket. In other words, write requests that are put in a higher priority bucket (by means of their FE tracks) would incur a lower aging period and will be destaged faster.

Parameter E—MD balance: This parameter measures the ratio between the size of the portion of GM 142 (and/or cache 202) in which FE metadata is stored and the size of the portion of GM 142 (and/or cache 202) in which BE metadata is stored.

An example is now provided of a method for determining the respective aging time of each of the buckets in the aging queue 218. The method may be executed by module 220. Each of the buckets in aging queue 218 may be assigned a default aging time. For example, bucket 0 may be assigned a default aging time of 10 seconds, bucket 1 may be assigned a default aging time of 20 seconds, and bucket 2 may be assigned a default aging time of 30 seconds. These default aging times may be adjusted (e.g., increased or decreased) based on dynamic properties of the runtime system resources of storage system 133. For example, the value of one or more of parameters A-E may be determined and the aging time of any of the buckets in aging queue 218 may be determined in accordance with the equation of $$uat = \frac{1}{q} * \sum_{n=1}^{q} (dat * k_n * p_n),$$

where uat is the updated aging time for any of the buckets in aging queue 218, dat is the default aging time of the same bucket, $p_n$ is the value of one of parameters A-F, and $k_n$ is a scaling constant that corresponds to parameter $p_n$. The constant $k_n$ may be equal to 1 or another value.

An example is now provided of another method for determining the respective aging time of each of the buckets in aging queue 218. The method uses a machine learning (ML) model to determine the aging time of any of the buckets in aging queue 218. The ML model may be executed by module 220 and/or on one or more computing devices that are part of the storage system 133. The ML model may receive as input the identifier of a bucket and the values of one or more parameters A-E. The model may output the value of the aging time of the identified bucket. In one example, the machine learning model may include a neural network, such as a feed-forward neural network (FNN), a bidirectional encoder model (BERT) or a generative pre-trained transformer model (GPT). The present disclosure is not limited to using any specific type of ML model. The model may be trained by using any supervised or unsupervised training algorithm. The model may be trained based on a training dataset that includes a plurality of entries. Each entry may include a first portion and a second portion. The first portion may include the values of one or more parameters A-E. The second portion may be a label that identifies an appropriate aging time. The label may be used only when the model is trained by using a supervised training algorithm.

FIG. 2 is provided as an example only. Although, in the example of FIG. 2, aging queue 218 includes three buckets, alternative implementations are possible in which aging queue 218 includes a larger number of buckets (or a smaller number of buckets—e.g. 1 bucket or 2 buckets). In this regard, it will be understood that the present disclosure is not limited to any specific implementation or size of aging queue 218. According to the example of FIG. 2, the bucket selection module 216 is implemented as part of BE 144. However, the present disclosure is not limited to any specific implementation of bucket selection module 216. For example, in some instances, bucket selection module 216 may be implemented as part of DS 143. According to the example of FIG. 2, module 220 is implemented as part of BE 144. However, the present disclosure is not limited to any specific implementation of module 220. For example, in some implementations, module 220 may be implemented as part of DS 143. According to the example of FIG. 2, module 204 is implemented as part of FE 141, however in alternative implementations, module 204 may be implemented as part of a different component of storage system 133. According to the example of FIG. 2 module 206 and managers 208-210 are implemented as part of DS 143, however in alternative implementations, any of module 206 and managers 208-210 may be implemented as part of a different component of storage system 133. According to the present example, module 224 is implemented as part of BE 144. However, in alternative implementation, module 224 may be implemented as part of a different component of storage system 133.

The term "queue" as used in the phrase "aging queue" is not intended to imply a specific configuration or organization on the aging queue 218 and/or the buckets of the aging queue 218. The present disclosure is not limited to using any specific data structure to implement the aging queue 218 and/or the individual buckets in the aging queue 218. For example, the aging queue 218 may be implemented as a tree structure, a linked list, or an array of tree structures. Similarly, each of the buckets in aging queue 218 may be implemented as any suitable type of data structure, such as a queue data structure, a tree data structure, and so forth. In one example, aging queue 218 may be implemented as a doubly-linked list of SSLO objects. The term "queue" as used in the phrase "write commit queue" is not intended to imply a specific configuration of the write commit queue 222. Write commit queue 222 may be implemented by using a queue data structure, a tree structure, and/or any suitable type of data structure. The phrase "placing an entity in a data structure" may refer to one or more of: (i) storing the entity in the data structure, (ii) storing a pointer to the entity in the data structure, and/or (iii) storing in the data structure any suitable type of information that can be used to retrieve the entity and/or information that is stored in the entity. The term "pointer to an entity" refers to any information that can be used directly or indirectly to retrieve the entity or information stored in the entity.

Although in the example of FIG. 2, identifiers of SSLO objects are placed (or stored) in the aging queue, the present disclosure is not limited to storing any specific information in aging queue 218 which can be used to identify FE tracks and/or BE tracks of write requests that are pending in the storage system 133. The phrase "placing an FE track in a bucket of an aging queue" may refer to placing an identifier of the FE track in the bucket, placing in the bucket an identifier of an FWRO object that points to the FE track, placing in the bucket an identifier of an SSLO object that points to the FWRO object, and/or placing in the track any suitable information that can be used to identify the FE track or retrieve information that is stored in the FE track. The phrase "placing a BE track in a bucket of an aging queue" may refer to placing an identifier of the BE track in the bucket, placing in the bucket an identifier of a BE_SSLO object that points to the BE track, and/or placing in the bucket any suitable information that can be used to identify the BE track or retrieve information that is stored in the BE track. The term "pointer" may refer to a direct or indirect pointer.

In the example of FIG. 2, one or more of parameters 1-5 are used to determine the bucket where an FE track, BE track, or SSLO object, etc. would be placed. However, the present disclosure is not limited to any specific information being used as a basis for selecting a bucket in aging queue 218, for as long as storage system 133 is provided with the facilities for dynamic (or repeated) bucket selection based on dynamic runtime resources of storage system 133.

In the example of FIG. 2, one or more of parameters A-F are used to determine the aging time of the buckets in aging queue 218. However, the present disclosure is not limited to any specific information being used as a basis for assigning the aging time of the buckets in aging queue 218, for as long as storage system 133 is provided with the facilities for dynamic (or repeated) recalculation of the aging times of the buckets in aging queue 218. The methods discussed above for assigning bucket aging time may result in an MD balance that results in an improved response time of storage system 133. Parameter E (i.e., MD balance) may or may not be used in determining the aging time of a bucket. In some implementations, Parameter E may not be used at all, while improved MD balance still remains a consequence of the dynamic updating of bucket aging times.

Figure 3:
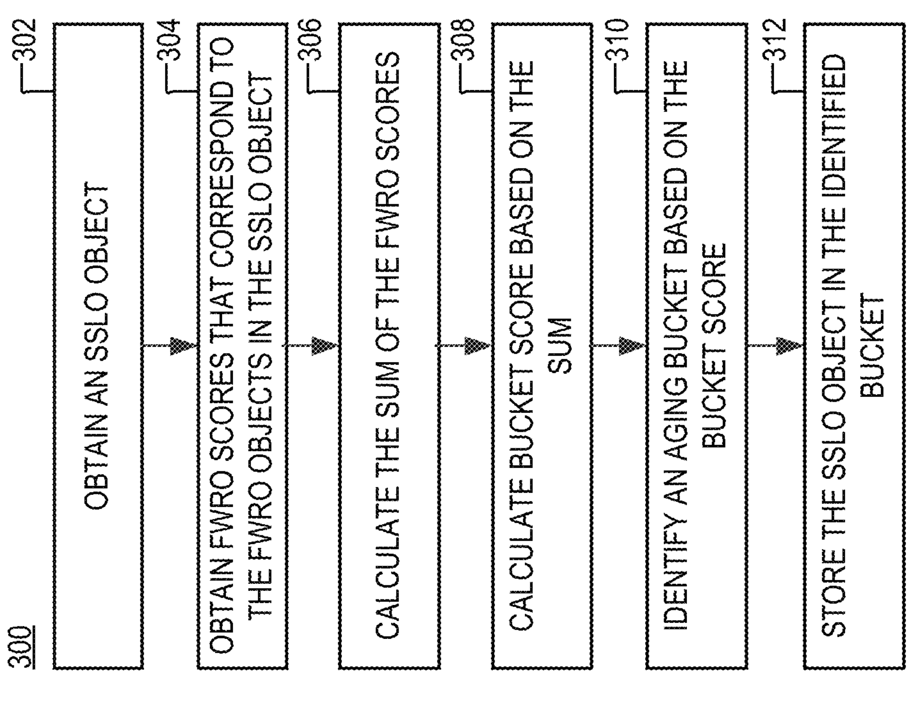
FIG. 3 is a flowchart of an example of a process, according to aspects of the disclosure.

FIG. 3 is a flowchart of an example of a process 300 for placing an SSLO object in the aging queue 218, according to aspects of the disclosure. Process 300 may be executed by one or more computing devices that are part of storage system 133.

At step 302, an SSLO object is obtained.

At step 304, a different respective fwro score is calculated for each of the FWRO objects in the SSLO object. For example, the fwro score may be equal to (or otherwise based on) the product of the hot/cold level of the FWRO object and the update frequency of the FWRO object. However, the present disclosure is not limited to any specific method for calculating the fwro score. The fwro score may be any measure of the frequency at which the tracks in the FWRO object are expected to be updated in the future or have been updated in the past. In some implementations, the fwro score may be equal to or otherwise based on only one of the hot/cold level of the FWRO object (e.g., parameter 1 of the FWRO object or its corresponding FE track) or the update frequency of the FWRO object (e.g., parameter 2 of the FWRO object or its corresponding FE track).

At step 306, the sum is calculated of the respective fwro_scores of the FWRO objects in the SSLO object. As can be readily appreciated, when the SSLO object includes only one SSLO object, the sum may be equal to the fwro score of the SSLO object.

At step 308, a bucket score is identified for the SSLO object by multiplying the sum (calculated at step 306) by a scalar to obtain a bucket score for the SSLO object. The scalar may be calculated based on the values of one or more of parameters 3-5. The present disclosure is not limited to any specific method or formula for calculating the value of the scalar. In one example, the formula for calculating the scalar may be arranged such that the write pattern of the SSLO object being sequential exerts a positive contribution on the end value of bucket score, and the write pattern being random exerts a negative contribution on the end value of the bucket score. In another example, the formula for calculating the scalar may be arranged such that the WP level of storage system 133 being high (or above a threshold) exerts a positive contribution to the end value of the bucket score, and the WP level being low (or below the threshold) exerts a negative contribution on the bucket score. In this example, a lower bucket score corresponds to a higher priority and vice versa.

In one example, the value of the scalar may be calculated by using a machine learning model. The model may receive as input the values of one or more of parameters A-E and 1-5, and output an indication of the scalar. The model may output the value of the aging time of the identified bucket. In one example, the machine learning model may include a neural network, such as a feed-forward neural network (FNN), a bidirectional encoder model (BERT) or a generative pre-trained transformer model (GPT). The present disclosure is not limited to using any specific type of ML model. The model may be trained by using any supervised or unsupervised training algorithm. The model may be trained based on a training dataset that includes a plurality of entries. Each entry may include a first portion and a second portion. The first portion may include a different set of values for one or more of parameters 1-5 and A-E. The second portion may be a label that includes the value of the scalar. The label may be used only when the model is trained by using a supervised training algorithm.

At step 310, the number of one of the buckets in the aging queue 218 is identified by normalizing the bucket score to the number of buckets in the queue. For example, if there are three buckets in aging queue 218, and the bucket score falls in the first third of the range for the bucket score, the SSLO object (obtained at step 302) may be placed in bucket 0. If the bucket score falls in the second third of the range, the SSLO object may be placed in bucket 1. If the bucket score falls in the last third of the range, SSL object may be placed in bucket 0.

At step 312, the SSLO object is stored in the bucket of the aging queue 218 whose number is identified at step 310.

Figure 4:
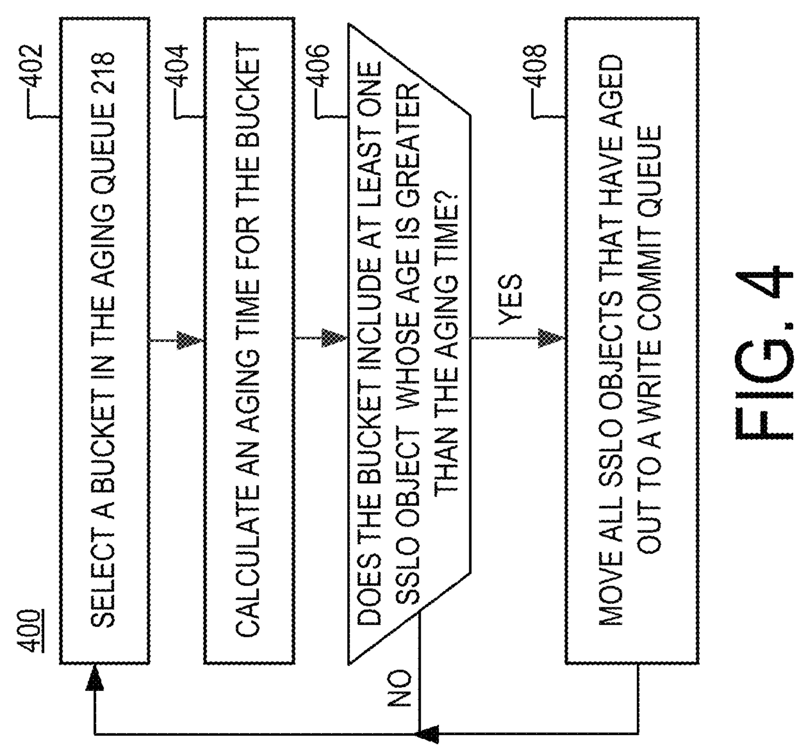
FIG. 4 is a flowchart of an example of a process, according to aspects of the disclosure.

FIG. 4 is a flowchart of an example of a process 400 for removing SSLO objects from aging queue 218, according to aspects of the disclosure. Process 400 may be executed by one or more computing devices that are part of storage system 133.

At step 402, a bucket in the aging queue 218 is selected. In some implementations, the bucket may be selected by using a round-robin algorithm.

At step 404, an aging time for the bucket is calculated. The aging time may be calculated in the manner discussed above with respect to FIG. 2. The present disclosure is not limited to any specific method for calculating the aging time.

At step 406, a determination is made if the bucket (selected at step 402) includes one or more SSLO objects whose age is greater than the aging time calculated at step 404. The term "age of an SSLO object" as used herein refers to the time which the SSLO object has spent in the bucket. If the bucket contains objects whose age is greater than the bucket's aging time, process 400 proceeds to step 408. Otherwise, process 400 returns to step 402 where another bucket is selected.

At step 408, all SSLO objects (in the selected bucket) whose age exceeds the aging time of the bucket are removed from the aging queue 218 and stored in the write commit queue 222. As discussed above, following the placement of the aged SSLO objects in the write commit queue 222, the write requests corresponding to the SSLO objects are completed.

In some implementations, process 400 may be executed in conjunction with process 300. In this regard, process 400 describes an arrangement in which storage system 133 waits until the SLLO object (stored at step 310) has aged out of the bucket it has been placed in, after which storage system 133 proceeds to destage the SSLO object into the write commit queue. Waiting until the object has aged out may include repeatedly (after some delay) updating the aging time of the bucket and checking to see if the SSLO object has been stored in the bucket for longer than the updated aging time.

As noted above, the technique for aging, an example of which is described above with respect to FIGS. 2-4, is advantageous because it enables storage system 133 to use aging to control the ratio of FE TID and BE TID metadata usage, if system conditions allow. This is especially useful for disposing efficiently of front-end I/Os. As discussed above, the use of aging delays the time when BE TID metadata would need to be paged in from permanent storage to cache. In this regard, increasing the aging time of a bucket may temporarily give storage system 133 more time (or resources) to page in FE TID metadata to dispose faster of FE I/Os which might otherwise disproportionately slow down the operation of storage system 133.

Figure 5:
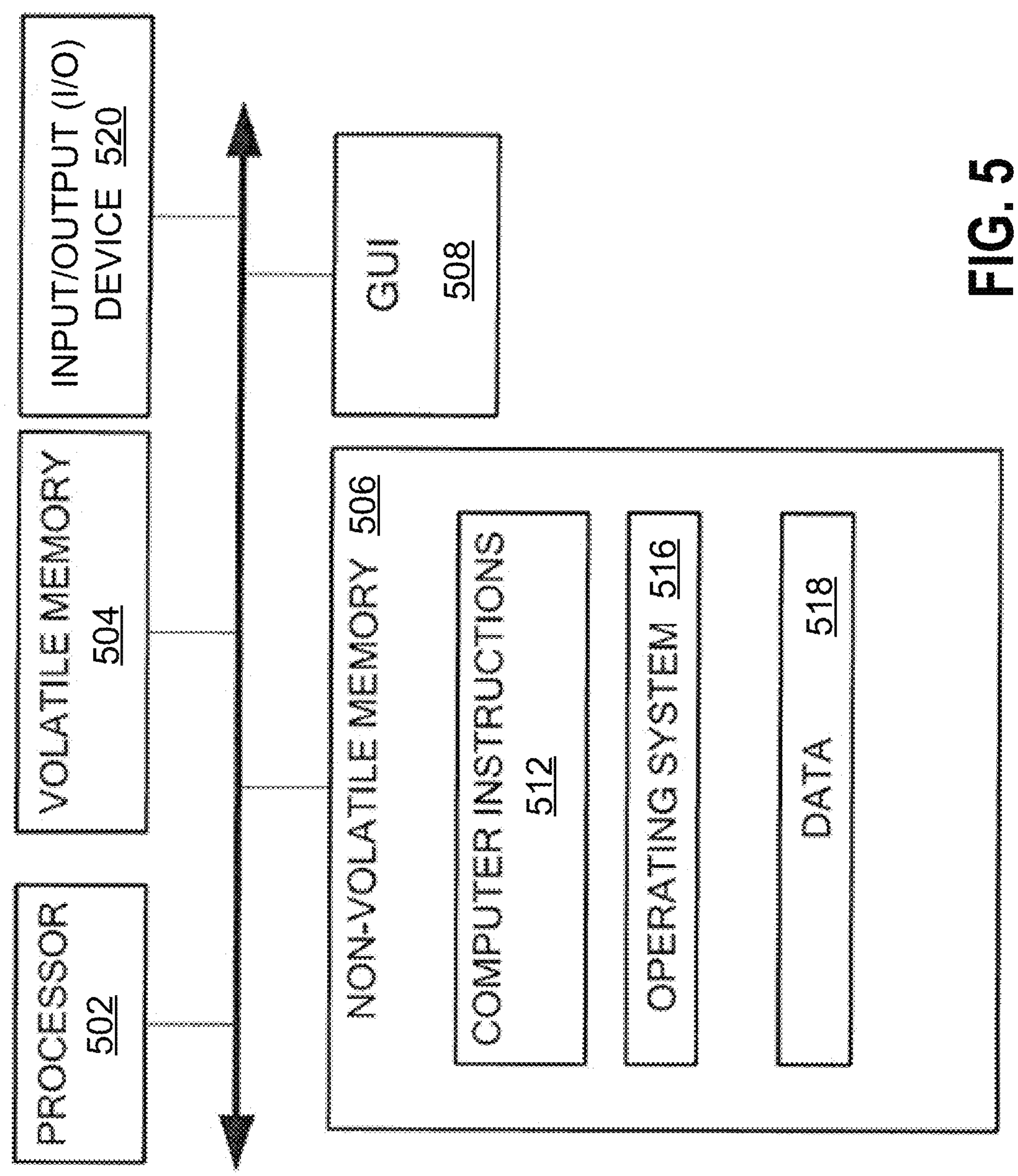
FIG. 5 is a diagram of an example of a computing device, according to aspects of the disclosure.

Referring to FIG. 5, in some embodiments, a device 500 may include processor 502, volatile memory 504 (e.g., RAM), non-volatile memory 506 (e.g., a hard disk drive, a solid-state drive such as a flash drive, a hybrid magnetic and solid-state drive, etc.), graphical user interface (GUI) 508 (e.g., a touchscreen, a display, and so forth) and input/output (I/O) device 520 (e.g., a mouse, a keyboard, etc.). Non-volatile memory 506 stores computer instructions 512, an operating system 516 and data 518 such that, for example, the computer instructions 512 are executed by the processor 502 out of volatile memory 504. Program code may be applied to data entered using an input device of GUI 508 or received from I/O device 520.

Figure 6:
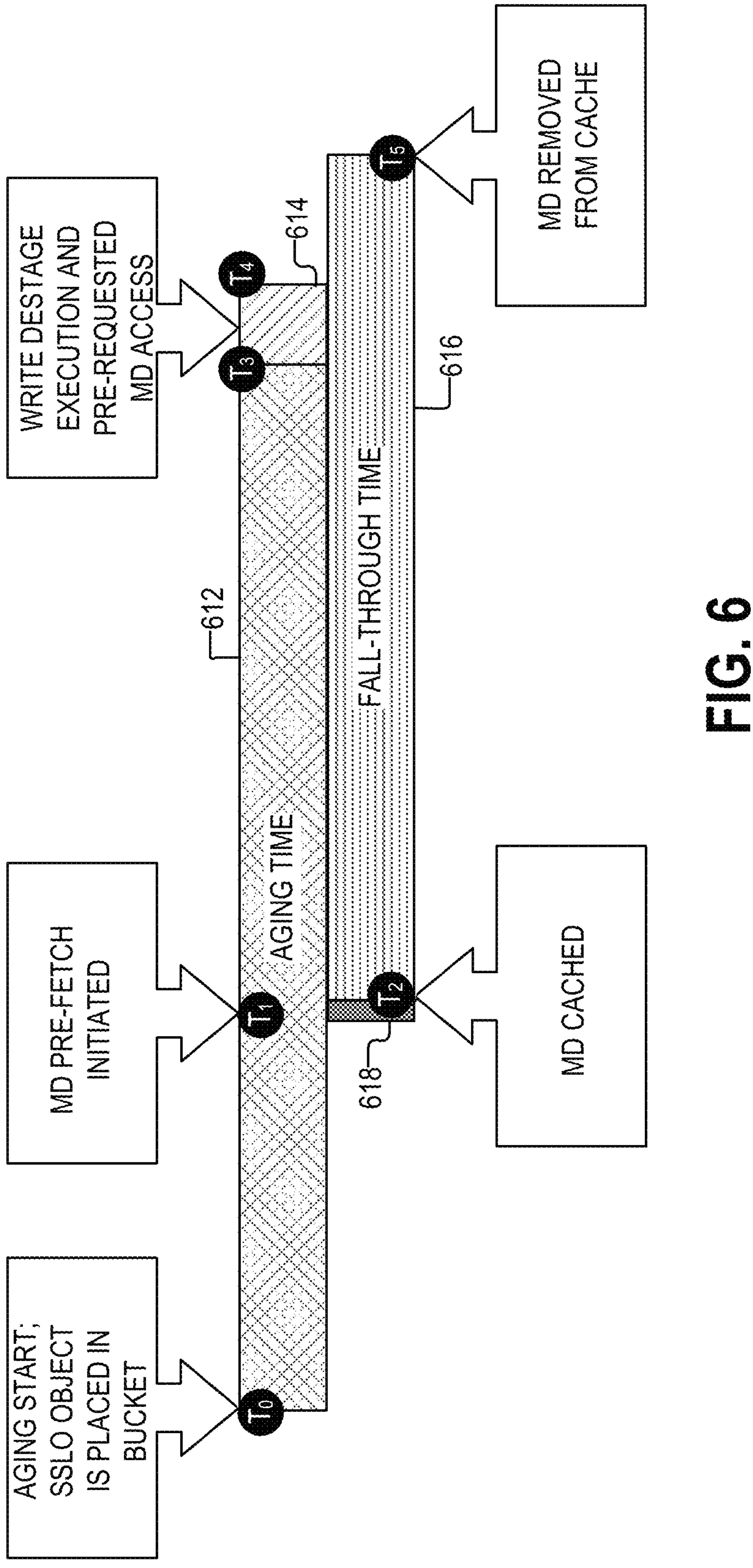
FIG. 6 is a schematic diagram illustrating a process for prefetching metadata, according to aspects of the disclosure.

FIG. 6 is a sequence diagram illustrating a process 600 for prefetching BE metadata, according to aspects of the disclosure. FIG. 6 shows some of the steps that are performed with respect to a single SSLO object that is placed in one of the buckets of aging queue 218. These steps are shown against timelines 612 and 616. Timeline 612 represents the aging time of the bucket in which the SSLO is placed and/or the age of the SSLO object. Timeline 616 represents the fall-through time for BE metadata that needs to be prefetched.

At time $T_0$, an SSLO object is placed in one of the buckets of aging queue 218.

At time $T_1$, the prefetching of BE metadata that is associated with the SSLO object is initiated. Initiating the prefetching may include making one or more system calls and/or taking any type of action that would start the process which ultimately results in the BE metadata being retrieved from RAID array 103 and being stored in cache 202.

At time $T_2$, the prefetching of BE metadata that is associated with the SSLO object is completed, and the BE metadata is stored in cache 202. The time it takes to complete the prefetching is equal to the duration of the period starting at time $T_1$ and ending at time $T_2$. The time it takes to complete the prefetching is represented by block 618.

At time $T_3$, the SSLO object is aged out of the aging queue 218. Specifically, the SSLO object is removed from the aging queue 218 and stored in the write commit queue 222. Furthermore, at time $T_3$, after the SSLO object is placed in the write commit queue 222, and destage module 224 retrieves, from cache 202, BE metadata that corresponds to the SSLO object. Afterwards, destage module 224 initiates any actions needed to complete the write requests associated with the SSLO object.

At time $T_4$, the write requests associated with the SSLO object are completed. The period in which the write requests are being completed starts at time $T_3$ and ends at time $T_4$. This period is referred to as a write destage window, and is represented by block 614. Completing the write requests includes storing, in RAID array 103, the respective user data of each of the write requests. The BE metadata that is pre-fetched at times $T_1$-$T_2$ is used to complete the write requests.

At time $T_5$, the BE metadata fetched at time $T_2$ is removed from cache 202.

In some respects, FIG. 6 illustrates that the prefetching should be timed correctly. Specifically, the prefetching should be performed late enough after the SSLO object is stored in the aging queue 218 in order to prevent the BE metadata from being removed from cache 202 before it is used. In the example of FIG. 6, the fall-through time is shorter than the aging time of the bucket in which the SSLO object is placed. For this reason, the prefetching should be performed after a certain delay has passed after the SSLO object is placed in aging queue 218. Otherwise, if the prefetching is performed at time $T_0$, the BE metadata and/or other metadata would be removed from cache 202 before the SSLO object is placed in the write commit queue 222.

In the example of FIG. 6, only BE metadata is pre-fetched. The BE metadata may include a plurality of BE metadata items (e.g., BE TIDs). Each BE metadata item is used to complete a different one of the write requests that are associated with the SSLO object. However, it will be understood that the present disclosure is not limited to pre-fetching any specific type of metadata, for as long as the pre-fetched metadata corresponds to one or more of the write requests associated with the SSLO object.

Figure 7:
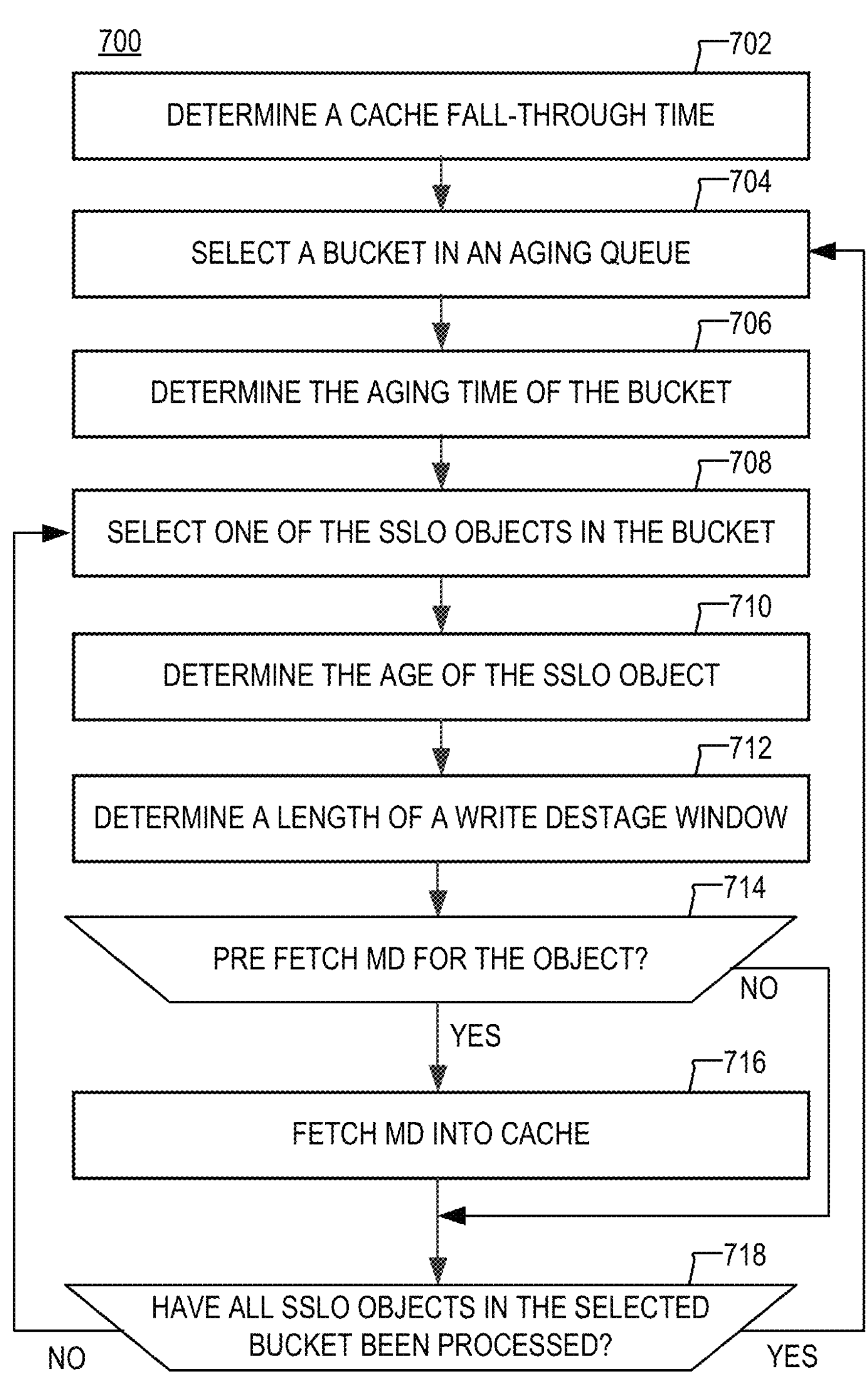
FIG. 7 is a flowchart of an example of a process according to aspects of the disclosure.

FIG. 7 is a flowchart of an example of a process 700, according to aspects of the disclosure. According to the present example, process 700 is performed by module 220.

However, the present disclosure is not limited to any entity or set of entities performing process 700.

At step 702, module 220 determines the fall-through time of cache 202. In some implementations, the fall-through time may be determined by sending a request from module 220 to module 206 and receiving the fall-through time in response. Alternatively, the fall-through time may be made by placing a call to an API facility provided by module 206, and receiving the fall-through time in response.

At step 704, module 220 selects a bucket in aging queue 218. In some implementations, the bucket may be selected by using a round-robin algorithm.

At step 706, module 220 detects the aging time of the bucket (selected at step 704).

At step 708, module 220 selects one of the SSLO objects in the bucket (selected at step 704).

At step 710, module 220 detects the age of the SSLO object (selected at step 708). It will be recalled that the age of the object is the duration for which the SSLO object has been stored in the bucket by the time step 710 is executed.

At step 712, module 220 determines the length of the write destage window of storage system 133. In some implementations, the length of the write destage window may be determined by sending a request to module 224 and receiving the length in response. Alternatively, the fall-through time may be made by placing a call to an API facility provided by module 224 and receiving the fall-through time length in response.

At step 714, module 220 determines whether to prefetch BE metadata and/or other metadata for the SSLO object. The BE metadata and/or other metadata may include any suitable type of data that is needed to finish the completion of any (or each) of the write requests that are associated with the SSLO object. As noted above, an SSLO object may be associated with a write request if the SSLO object points to an FE track that contains user data and/or metadata corresponding to the write request.

In some implementations, to determine whether the BE metadata needs to be prefetched, module 220 may evaluate one or both of the following conditions.

Condition 1: This condition detects whether storage system 133 is in a state in which the write requests associated with the SSLO object can be completed in time before the BE metadata is removed from cache 202 by a replacement algorithm of storage system 133. In one example, Condition 1 may evaluate to true when the fall-through time (determined at step 702) is greater than the difference between the sum of the remaining time of the SSLO object (selected at step 704) and the length of the write destage window (determined at step 712). The remaining time of the SSLO object may be the time that the SSLO object has left to spend in the aging queue 218 before being removed to the write commit queue 222. The remaining time of the SSLO object in the bucket may be equal to (or otherwise based on) the difference between the aging time of the bucket (determined at step 706) and the age of the SSLO object (determined at step 710). The age of the SSLO object may be determined based on the difference between the current time and a timestamp of the SSLO object, which is indicative of when the SSLO object was placed in the bucket (selected at step 704).

Condition 2: This condition evaluates to true when a particular activation function evaluates to true. In one example, the activation function may evaluate to true when the value of a given system resource (or runtime statistic) of storage system 133 is above a predetermined threshold; otherwise, if the value of the given system resource (or runtime statistic) is below the threshold, the activation function may evaluate to false. In one example, the activation function may evaluate to true, when the amount of free space in cache 202 is above a threshold; if the amount of free space is below the threshold, the activation function may evaluate to false. In another example, the activation function may evaluate to true if the cache miss rate of storage system 133 (or a portion thereof) is above a threshold; otherwise, if the cache miss rate is below the threshold, the activation function may evaluate to false. In yet another example, the activation function may evaluate to true when the weighted average of the values of a plurality of system resources and statistics is above a threshold. By way of example, the plurality of system resources and statistics may amount of free space that is available in cache 202, current load on the storage system 133 (in IOs per second), cache miss rate, and/or any other suitable information.

In some implementations, the activation function may be implemented by using a machine learning model. In one example, the machine learning model may be executed by module 220. The machine learning model may receive as input the values of one or more system resources and run-time statistics and output either "true" or "false" in response. In one example, the machine learning model may include a neural network, such as a feed-forward neural network (FNN), a bidirectional encoder model (BERT) or a generative pre-trained transformer model (GPT). The present disclosure is not limited to using any specific type of ML model. The model may be trained by using any supervised or unsupervised training algorithm. The model may be trained based on a training dataset that includes a plurality of entries. Each entry may include a first portion and a second portion. The first portion of each entry may include the values of one or more system resources and/or runtime statistics that were recorded at approximately the same time. The second portion may be a label that indicates that the first portion corresponds to either a "true" or "false" evaluation of the activation function. The label may be used only when the model is trained by using a supervised training algorithm.

In some implementations, module 220 may evaluate only condition 1 at step 714. In such implementations, if condition 1 evaluates to true, process 700 may proceed to step 716, and if condition 1 evaluates to false, process 700 may skip step 716 and proceed to step 718 directly. Alternatively, in some implementations, module 220 may evaluate both condition 1 and condition 2. In such implementations, if both conditions 1 and 2 evaluate to true, process 700 may proceed to step 716, otherwise if at least one of conditions 1 and 2 evaluates to false, process 700 may skip step 716 and proceed to step 718 directly.

At step 716, module 220 fetches into cache 202 the BE metadata that is associated with the SSLO object (selected at step 708). In one example, module 220 may take any action that would cause module 206 to retrieve the BE metadata that is associated with the SSLO object from RAID array 103 and store the retrieved BE metadata in cache 202. By way of example, module 220 may place an API call to a facility that is provided by module 206. As another example, module 220 may transmit an instruction to module 206.

At step 718, module 220 determines if all SSLO objects in the bucket (selected at step 704) have been processed. If not all SSLO objects in the bucket have been processed, process 700 returns to step 708 where another SSLO object in the bucket is selected. Otherwise, if all SSLO objects in the bucket have been processed, process 700 returns to step 704 where another bucket in aging queue 218 is selected. In some implementations, for each SSLO object in a selected bucket, process 700 may execute a different respective iteration of steps 708-716.

In the example of FIG. 7, only BE metadata is pre-fetched. The BE metadata may include a plurality of BE metadata items (e.g., BE TIDs). Each BE metadata item is used to complete a different one of the write requests that are associated with the SSLO object. However, it will be understood that the present disclosure is not limited to pre-fetching any specific type of metadata, for as long as the pre-fetched metadata corresponds to one or more of the write requests that are associated with the SSLO object.

In some respect, the technique an example of which is discussed with respect to FIG. 7 is advantageous because it improves the input-output (I/O) throughput and I/Os per second (IOPS) of storage system 133 by minimizing page faults when write destage worker threads process the write-pending destage requests. In another aspect, the technique discussed with respect to FIG. 7 may help optimize page-in duration according to I/O statistics and patterns, thus improving metadata efficiency and fairness.

In some respects, the technique discussed with respect to FIG. 7 involves repeatedly scanning the buckets in aging queue 218. For example, the buckets may be scanned in a round-robin fashion, whereby all buckets are scanned sequentially, after which the sequential scan is resumed from the first bucket. Scanning any of the buckets in aging queue 218 may involve performing steps 708-716 of process 700 for each of the SSLO objects in the bucket. During the same scan of a bucket, each SSLO object in the bucket may be selected only once (e.g., at step 708).

In some implementations, process 700 may be modified to include a step whereby all SSLO objects in a bucket that is being scanned, whose age is greater than the aging time of the bucket, are removed from the bucket and placed in write commit queue 222. In such implementations, each scan of a bucket in aging queue 218 may include: (i) identifying the aging time of a bucket, (ii) identifying the respective age of each of the SSLO objects in the bucket, (iii) moving from the aging queue 218 to write commit queue 222 all SSLO objects in the bucket whose age is greater than or equal to the bucket's aging time, and (iv) prefetching metadata for all SSLO objects that satisfy a predetermined condition, such as Condition 1 which is discussed above.

Figure 8:
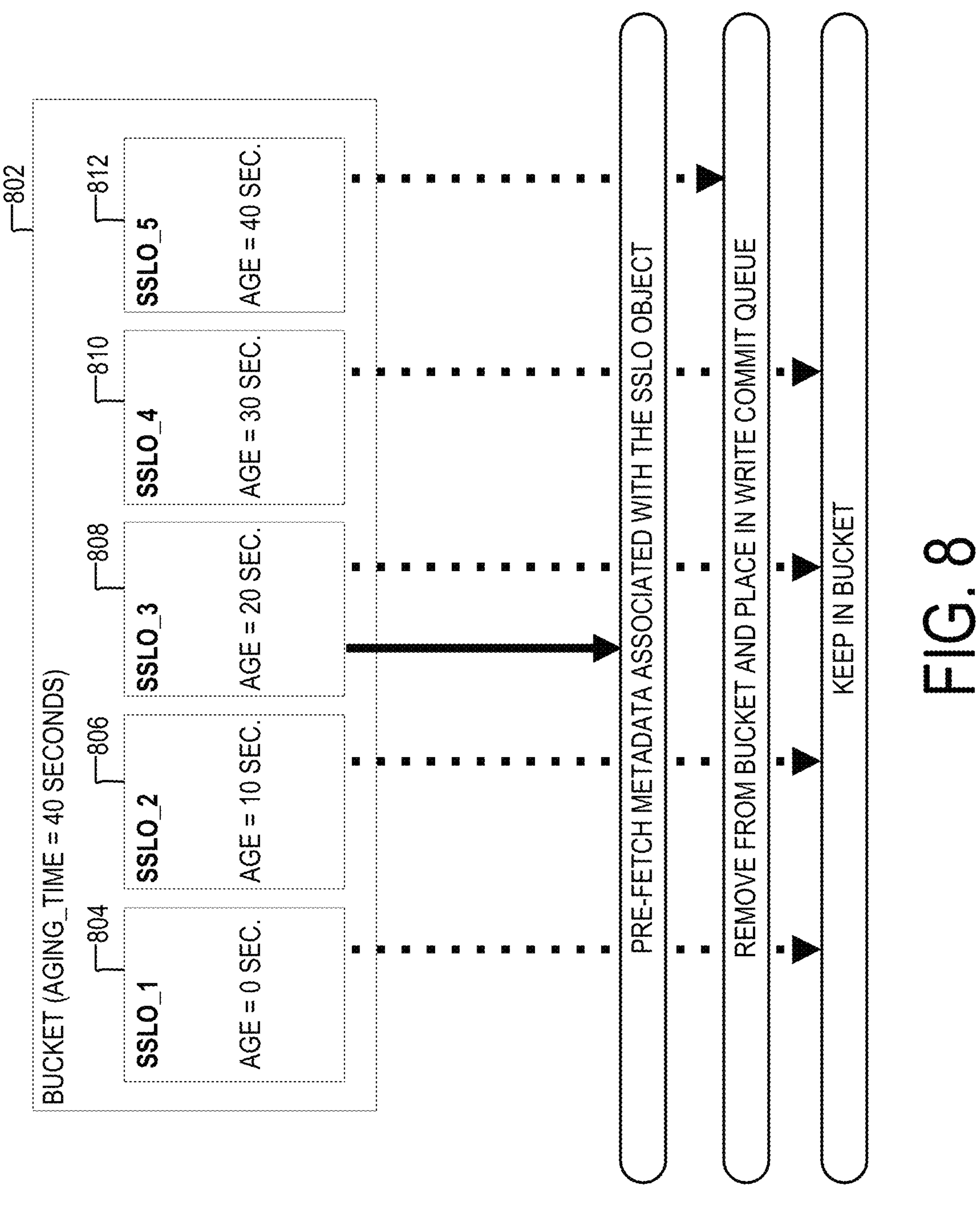
FIG. 8 is a schematic diagram illustrating the result of performing a bucket scan, according to aspects of the disclosure.

FIG. 8 shows the results of a single bucket scan when process 700 is modified to remove to write commit queue 222 SSLO objects that have aged out of aging queue 218. Shown in FIG. 8 is a bucket 802. Stored in bucket 802 are SSLO objects 804-812. The aging time of bucket 802 is 40 seconds. The age of SSLO object 804 is 0 seconds, the age of SSLO object 806 is 10 seconds, the age of SSLO object 808 is 20 seconds, the age of SSLO object 810 is 30 seconds, and the age of SSLO object 812 is 40 seconds. It will be recalled that the age of each of SSLO objects 802-812 is the time that the SSLO object has spent in bucket 802. In the example of FIG. 8, SSLO object 812 is removed from bucket 802 and placed in the write commit queue 222 because its age is equal to the aging time of bucket 802. SSLO objects 804-810 are allowed to remain in bucket 802 because their respective ages are less than the aging time of bucket 802. Furthermore, metadata associated with SSLO object 808 is prefetched during the scan illustrated in FIG. 8. Furthermore, the metadata corresponding to SSLO objects 804 and 806 has not been prefetched yet because they are not sufficiently aged. In contrast, the metadata for SSLO objects 810 and 812 has been prefetched during earlier bucket scan(s).

Returning to FIG. 2, a method is provided for generating caching hints using the aging queue 218. In some implementations, module 220 may be configured to determine whether I/O requests follow a sequential or random write pattern. Based on this classification, module 220 generates hints associated with one or more write requests, indicating whether they fall into a sequential or random write category. Each of the hints may be provided to BE paging module 206. BE paging module 206 may use the hints to remove BE metadata corresponding to the write requests from cache 202. Specifically, assuming all else is equal, BE paging module 206 retains BE metadata for write requests that are part of a sequential write pattern in cache 202 for a longer duration compared to metadata for write requests following a random write pattern. In some implementations, module 220 generates these hints by executing processes 900 and 1100, which are discussed further below with respect to FIGS. 9 and 11.

To generate the hints, module 220 may use ring buffer 230 and a pattern detector 232. Ring buffer 230 may be stored in the memory of one or more computing devices that are part of the storage system 133. Pattern detector 232 may be executed by one or more computing devices that are part of storage system 133. Ring buffer 230 may be configured to store one or more page objects 231. The ring buffer 230 may be used to keep track of the most recently accessed FE tracks (and/or SSLO objects). Each of the page objects 231 may be an object that is associated with a plurality of SSLO objects. In a preferred implementation, each page object 231 may map to 16 SSLO objects, each SSLO object may map to 48 tracks, and each BE TID page that is brought into the cache 202 may map to 768 FE tracks. Each FE track may be associated with one or more write requests. As used herein, the phrase "BE metadata" may refer to a block of BE metadata, such as a BE TID page, that is brought into cache 202 for the purpose of servicing a write request. In addition to including BE metadata corresponding to the address where the data corresponding to the write request is going to be written, the block may also include BE metadata corresponding to adjacent addresses. A BE TID page may include a plurality of BE TIDs.

The capacity of the ring buffer 230 may depend on the I/O throughput of storage system 133, the rate at which FE tracks (and/or SSLO objects) are queued into the aging queue 218 and/or write commit queue 222, and the number of page objects that are associated with the page object 231.

Next, the relationship between FE tracks and the physical addresses where data is written is explained. Generally, each FE track is used to store data corresponding to a set of sequential addresses (e.g., physical or logical addresses, etc.). Thus, when multiple write requests form a sequential write pattern, the FE metadata for those requests will be located in the same FE track or adjacent FE tracks. Similarly the BE metadata for those requests will be located in the same BE track or adjacent BE tracks.

The relationship between page objects and SSLO objects is described in detail below. Each page object is assigned a unique ID and can accept a fixed number of SSLO objects. The mapping between page objects and SSLO objects is determined based on the IDs of the SSLO objects. For example, page object 0 may be mapped to SSLO objects 0-15, while page object 1 may correspond to SSLO objects 16-31, and so on. The ID of the page object that corresponds to a given SSLO object can be calculated using the formula: PAGE_ID=(int) [SSLO_ID/PAGE_SIZE], where SSLO_ID is the ID of the SSLO object, PAGE_ID is the ID of the corresponding page object, and PAGE_SIZE is the number of SSLO objects in a page.

The association between SSLO objects and FE tracks is now described in further detail. Each SSLO object may have an SSLO object ID. Each SSLO object may accept a fixed number of tracks. The mapping between SSLO objects and tracks may be determined based on track IDs. For example, SSLO 0 may be mapped tracks 0-47. SSLO 1 may be mapped to FE tracks 48-95, and so forth. By way of example, the ID of the SSLO object that is mapped a given FE track may be determined according to the equation of SSLO_ID=(int) [TRACK_ID/SSLO_SIZE], where SSLO_ID is the ID of the SSLO object, TRACK_ID is the ID of the FE track, and SSLO_SIZE is the number of tracks that is mapped to the SSLO object.

The addition of an FE track to the aging queue 218 is now described in further detail. When an FE track is added to the aging queue 218, the corresponding SSLO object ID for the track ID is identified. The identified SSLO object is then configured to point to the FE track (e.g., by flipping a bit in a bit mask of the SSLO object that corresponds to the ID of the FE track). If this SSLO object is not already in one of the buckets within the aging queue 212, it is then added to a bucket in the aging queue 218.

The addition of an SSLO object to a page is now described in further detail. Every time an SSLO object is removed from the aging queue and added to the write commit queue 222, the SSLO object may also be added to a page object, which is (or will be) stored in ring buffer 230. To add the SSLO object to the page object, the ID of the page object that corresponds to the ID of the SSLO object may be identified (e.g., by using the above equation, etc.). Next, a track bit mask, which is one of the attributes of the page object, may be updated (by flipping a bit in it) to indicate that the SSLO object is now added to the page object.

As noted above, an SSLO object may include an SSLO object mask, in which each bit corresponds to a different FE track mapped to it. The value of each bit indicates whether the FE track contains data awaiting destaging to permanent storage. For instance, a value of '1' signals that the track is being pointed to by the SSLO object and contains data waiting to be destaged, while a value of '0' indicates it does not.

Similarly, a page object may contain a page object mask. The page object mask may include a plurality of bit subsets. Each bit subset may correspond to a different SSLO object. Each bit in a bit subset may correspond to a different FE track in the bit subset's corresponding SSLO object. Each bit indicates whether the bit's corresponding FE track contains data that is (or was) waiting to be destaged to permanent storage. Thus, like the SSLO object mask, a value of '1' indicates that the front-end track is being pointed to and contains data ready for destaging, whereas a value of '0' indicates the opposite.

When an SSLO object is added to a page object, the following steps may be performed: (i) retrieve the SSLO object mask of the SSLO object, (ii) retrieve the page object mask of the page object, (iii) retrieve the bit subset in the page object mask that corresponds to the SSLO object, and (iv) update the bit subset by performing an Exclusive OR operation the bit subset with the SSLO object mask. The update may be performed in accordance with the equation of bit_subset=bit_subset XOR SSLO_object_mask, where bit_subset is the bit subset, and SSLO_object_mask is the SSLO object mask. This operation has the effect of flipping to '1' the value of all bits in the bit subset that correspond to FE tracks in the SSLO objects that contain data that is waiting to be destaged to permanent storage.

The lifecycle of a given page object is now described in further detail. When the given page object is first instantiated, an SSLO object may be added to the given page object, and the given page object may be added to the ring buffer 230. While the given page object is waiting in the ring buffer 230, additional SSLO objects may be added to the given page object. As new page objects (or page object instances) are added to the ring buffer 230, the given page object would be overwritten eventually, which is inherent in the nature of ring buffers.

The attributes of a page object (in one example) are now described in further detail. As noted above, one of the attributes of the page object may be the page object mask. In addition to this, the page object may also include timestamps first_access_timestamp and last_access_timestamp. Timestamp first_access_timestamp identifies the time when the first SSLO object is added to the page object, and timestamp last_access_timestamp indicates the time when the page object was last updated to include an SSLO object.

The addition of an SSLO object to the ring buffer 230 is now described in further detail. As noted above, when an SSLO object is removed from the aging queue 218, the SSLO object may be added to the ring buffer 230 via the placement in the ring buffer 230 of a corresponding page object. The SSLO object may be added to the ring buffer 230 by performing the following steps:

(i) obtain the ID of the SSLO object, (ii) map the SSLO object ID to a corresponding page object ID by using the equation discussed above, (iii) detect whether a page object instance bearing the page object ID is already stored in ring buffer 230, (iv) when a page object instance bearing the page object ID is not already stored in ring buffer, branch to subprocess 1, and (v) when a page object instance bearing the page object ID is already stored in the ring buffer, branch to subprocess 2.

Subprocess 1 may be executed by performing the following steps:

(a) instantiate a new page object instance bearing the page object ID, (b) add the SSLO object to the page object instance, and (c) add the page object instance to the ring buffer 230.

Subprocess 2 may be executed by performing the following steps:

(d) retrieve from ring buffer 230 the page object instance which bears the page object ID (determined at step (ii)), (e) retrieve the last_access_timestamp of the page object instance, (f) if the last_access_timestamp indicates that the last time when the page object was updated was earlier than X seconds ago (e.g., earlier than 1 second ago), instantiate a new page object instance that bears the page object ID (obtained at step (ii)), add the SSLO object to the new page object instance, and add the page object instance to the ring buffer 230, and (g) if the last_access_timestamp indicates that the last time when the page object was last updated was sooner than X seconds ago (e.g., less than 1 second ago), add the SSLO object to the SSLO object instance (identified at step (d)), and update the last_access_timestamp of the SSLO object.

Figure 9:
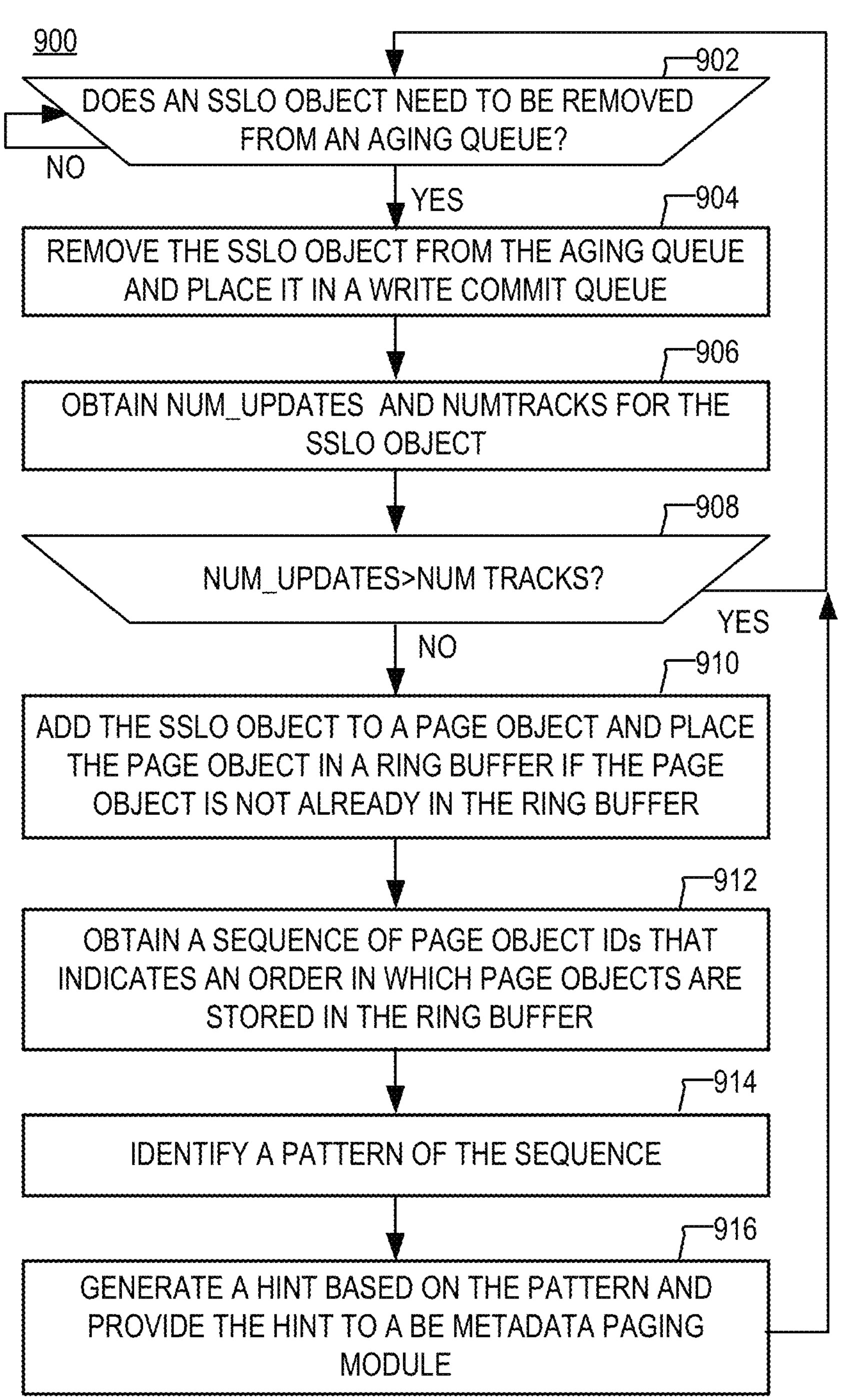
FIG. 9 is a flowchart of an example of a process, according to aspects of the disclosure.

FIG. 9 is a flowchart of an example of a process 900, according to aspects of the disclosure. According to the present example, process 900 is executed by module 220.

However, the present disclosure is not limited to any entity or set of entities performing process 902.

At step 902, module 220 detects whether an SSLO object needs to be removed from aging queue 218 and placed in the write commit queue 222. If the SSLO object needs to be removed from the aging queue 218, process 900 proceeds to step 904. Otherwise, process 900 returns to step 900

At step 904, module 220 removes the SSLO object from the aging queue 212 and places the SSLO object in the write commit queue 222.

At step 906, module 220 obtains a number of updates for the SSLO object and number of tracks in the SSLO object mask. The number of tracks may be determined based on the number of bits in the SSLO object. The number of updates for the SSLO object is the number of times an FE track that is pointed to by the SSLO object has been updated following the placement of the SSLO object in the aging queue 218 and prior to the removal of the SSLO object from the aging queue 218.

At step 908, module 220 determines if the number of updates is greater than the number of FE tracks. If the number of updates is greater than the number of FE tracks, process 900 returns to step 902. Otherwise, process 900 proceeds to step 910.

At step 910, the SSLO object is added to a page object. The page object may or may not be stored the ring buffer 230 already. If the page object is not stored in the ring buffer at the time when step 910 is executed, the page object is added to the ring buffer 230 at step 910. The SSLO object may be added to the page object and/or ring buffer 230 in the manner discussed above.

At step 912, a sequence of page object IDs is obtained. The sequence may contain as many (or fewer) object IDs as there are page objects in ring buffer 230. Each page object ID in the sequence may correspond to a different page object in ring buffer 230. The position of each object ID in the sequence may correspond to the position of the ID's corresponding page object in ring buffer 230. For example, the first ID in the sequence may belong to the first page object in the ring buffer 230 (e.g., the page object at index 1 of ring buffer 230), the second ID in the sequence may belong to the second page object in the ring buffer 230 (e.g., the page object at index 2 of ring buffer 230), the third ID in the sequence may belong to the third page object in the ring buffer 230 (e.g., the page object at index 3 of ring buffer 230), and so forth.

At step 914, a pattern of the sequence of IDs is identified. The pattern may be obtained by classifying the sequence with pattern detector 232. As a result of the classification, pattern detector 232 may output an indication of whether the pattern is a sequential pattern or a random pattern. In addition, the pattern detector 232 may output an indication of a sub-type of the pattern of the sequence. For example, the output of the pattern detector may indicate the sequence is "random with repetition", "pure random", or a "random with clusters". In general, when the sequence is classified into the sequential pattern category, this is taken as an indication by the present disclosure that at least one (or each) of the write requests that are being restaged by using the SSLO object (removed at step 904) is part of a sequential write pattern. On the other hand, when the sequence is classified into a random pattern category, this is taken as an indication by the present disclosure that at least one (or each) of the write requests that are being restaged by using the SSLO object (removed at step 904) is part of a random write pattern.

At step 916, module 220 generates a hint based on the on the outcome of the classification at step 914 and provides the hint to the module 206. As discussed further below with respect to FIG. 11, the hint is used by module 206 to set the duration for which at least BE TID page (or another block of metadata) would remain in cache. The hint may be associated with one or more of the write requests that are being destaged by using the SSLO object (removed at step 904). The hint may include any number, string, or alphanumerical string that identifies directly or indirectly a BE TID page that is associated with at least one of the write requests. In some implementations, the hint may identify multiple BE TID pages, where each BE TID page corresponds to a respective write requests. A BE TID page corresponds to a write request if the BE TID page contains metadata that is needed to complete (i.e., destage) the write request by storing the payload (or user data) of the write request in RAID array 103. The present disclosure, is not limited to any specific method for identifying the BE TID page(s) in the hint. For example, the BE TID page(s) may be identified by including in the hint one or more of: (i) the ID of the SSLO object (removed at step 904), (ii) the IDs of FE tracks that are pointed to by the SSLO objects, (iii) the addresses (logical or physical) that correspond to the hint's associated write request, etc.

In some implementations, the hint may be generated only when the sequence is classified (at step 914) into the sequential pattern. In other implementations, the hint may be generated irrespective of the outcome of the classification. In this case, the hint may include a string or a code indicating whether the sequence was classified into the sequential pattern category or a random pattern category. In some implementations, the hint may also include an indication of the subtype of the sequence pattern (e.g., pure random, random with clusters, or random with the repetition). In some implementations, the hint may be transmitted only when an activation function evaluates to true. The activation function may evaluate to true when the write pending level of storage system 133 and/or its CPU usage level exceeds a threshold. Additionally or alternatively, the activation function may evaluate to true when the miss rate of cache 202 for BE metadata falls below a threshold. In some implementations a separate hint may be generated and provided to module 206 for each of the write requests that is associated with the SSLO object (removed at step 904). In such implementations, each hit may indicate the BE TID page that is associated with the hint's corresponding write request. Additionally or alternatively, in some implementations, a single hint may be generated that corresponds to all of the write requests that are associated with the SSLO object (removed at step 904). In such implementations, the hint may identify the respective BE TID page of each of the write requests.

FIG. 10 provides an example of different page object ID sequence patterns. In the example of FIG. 10, page object ID sequence 1002 has a sequential pattern, page object ID sequence 1004 has a random pattern with repetition, page object ID sequence 1006 has a pure random pattern, and page object ID sequence 1008 with a random pattern with clusters. In the example of FIG. 10, a sequential pattern is characterized by the page object IDs being arranged in an increasing order such that each of the page object IDs is larger than the preceding page object ID. However, a sequential pattern may be characterized by the page object IDs being arranged in an increasing order, such that each page ID in the sequence is smaller than the on preceding it.

The present disclosure is not limited to any specific definition of a sequential or random pattern. The present disclosure is not limited to any specific definition of a random pattern sub-type. However, in general, a sequential pattern of write requests would be understood to include primarily write requests that write to consecutive physical (and/or logical) addresses and/or physical (and/or logical addresses) that are close to one another. For instance, a sequential pattern may be one in which the logical address (or physical address) of each of the write requests in the pattern is separated by no more than N places from the closest logical (or physical address) of another one of the write requests.

In some implementations, pattern detector 232 may implement a state machine to determine whether a sequence of page object IDs exhibits a random or sequential pattern and/or to identify the random pattern subtype, if applicable. Alternatively, pattern detector 232 may execute a machine-learning model that performs pattern matching. The machine-learning model may be trained with examples of different patterns, such as those shown in FIG. 10. The machine-learning model may be a neural network model and/or any other suitable type of machine-learning model. In some implementations, the machine-learning model may be similar to machine-learning models that are used to compare images. The machine-learning model may be configured to: (i) receive the sequence identified at step 912, (ii) compare the sequence to a set of sequence templates whose pattern and/or pattern subtype is known, and (iii) output the pattern and/or pattern subtype of the template that matches the sequence most closely. Each of the templates may be the same or similar to one of the strings 1002-1004 that are shown in FIG. 10. The pattern detector 232 may retrieve the templates (and the template's patterns and pattern subtypes) from a database (not shown) that is stored in the memory of one or more computing devices that are part of storage system 133.

Figure 11:
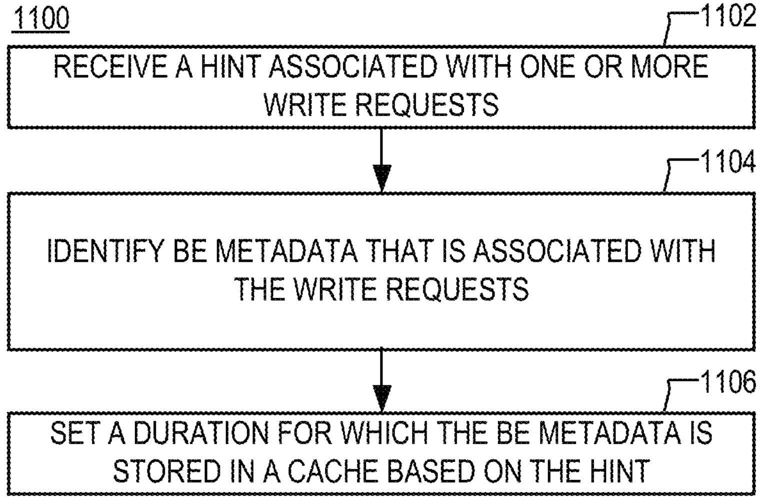
FIG. 11 is a flowchart of an example of a process, according to aspects of the disclosure.

FIG. 11 is a flowchart of an example of a process 1100, according to aspects of the disclosure. According to the present example, process 1100 is performed by module 206. However, the present disclosure is not limited to any entity or set of entities performing the process 1100. At step 1104, module 206 receives a hint that is associated with one or more write requests. At step 1104, module 206 identifies BE metadata that corresponds to the write requests. For example, module 206 may identify the BE TID page(s) that correspond to the write requests. And at step 1106, module 206 sets the duration for which the BE metadata would remain in cache 202 based on the hint.

In some implementations, step 1106 may be performed contemporaneously with module 206 fetching the BE metadata into cache 202. Additionally or alternatively, step 1106 may be performed after the BE metadata is fetched into cache 202. The phrase "setting the duration for which the BE metadata remains in cache 202" shall refer to any action that affects how long the BE metadata remains stored in cache 202 before being removed.

Consider an example in which module 206 utilizes an eviction queue to remove data from cache 202 in conjunction with a least recently used (LRU) algorithm or another type of cache eviction policy. Based on the eviction policy, module 206 may identify BE TID pages that are currently cached and are less likely to be needed soon. These identified BE TID pages can then be placed in the eviction queue, which organizes them for orderly eviction. Specifically, whenever eviction is needed, the BE TID page at the head of the queue may be evicted. After this, all remaining BE TID pages in the queue are shifted (e.g., shifted right if the head is on the side), with the second page in line becoming the new head.

In implementations where module 206 employs an eviction queue, if a hint is received indicating that one or more write requests are part of a random write pattern, module 206 may promote the BE TID page(s) containing metadata associated with the write requests to the head of the eviction queue. This promotion allows the BE TID page(s) to bypass the main cache replacement algorithm and/or normal aging processes, taking precedence over all other cached metadata when eviction becomes necessary. Consequently, this action may result in the BE TID page(s) being evicted sooner than others stored in cache 202, even if those have been there for a longer period.

Additionally or alternatively, the position of the BE TID pages in the eviction queue can be selected by module 206 based on the type and/or subtype of the write pattern indicated by the hint. For example, if the hint suggests that the write pattern is sequential, module 206 may place the BE TID page(s) at the back of the eviction queue (e.g., in the last 15% of the queue). Conversely, if the hint indicates a pure random write pattern, the BE TID page(s) may be positioned at the head of the queue (e.g., in the first 15% of the queue). If the hint indicates a random pattern with clusters, module 206 may place the BE TID page(s) in the second half of the queue (approximately between the 51st and 75th percentiles). Alternatively, if the hint suggests a random pattern with clusters, the BE TID page(s) may be positioned in the first half of the queue (somewhere between the 25th and 50th percentiles). In a queue with 100 slots, positioning a BE TID page between the $51^{st}$ and $75^{th}$ percentile of the queue may refer to placing the BE TID page in one of slots 51-75. In a queue with 100 places, positioning a BE TID page between the $25^{th}$ and $50^{th}$ percentile of the queue may refer to placing the BE TID page in one of slots 25-50.

In another example, setting the duration for which the BE metadata remains in cache may include detecting whether the hint indicates that its corresponding write requests are part of a sequential write pattern, extending the duration for which the BE metadata would remain in cache 202 if the write requests are part of a sequential write pattern, and leaving the duration unchanged (or reducing it) if the write requests are part of a random write pattern. Under this arrangement, BE metadata for a write request would remain longer in the cache 202 if the write request is part of a sequential write pattern than if the write request were part of a random write pattern. The phrase "extending the duration for which BE metadata would remain in cache" may pertain to an action that is taken at the time when the BE metadata is being stored in cache 202 or an action that is performed after the BE metadata is stored in cache 202. The present disclosure is not limited to any specific action being performed for as long as the action prolongs the stay of the BE metadata in cache 202.

Consider an example in which the cache 202 uses a least recently used (LRU) algorithm to replace BE metadata stored in the cache 202. In this example, each BE TID page (or another block of BE metadata) that is stored in the cache 202 may have an age. The age of the BE TID page may be equal to (or otherwise based on) the time that has passed since the BE TID page was last retrieved from cache 202. When a BE TID page needs to be removed from cache 202, module 206 may examine the respective ages of the BE TID pages that are stored in cache 202 and select the BE TID page that has the largest age for removal. In this example, the phrase "extending the duration for which a given BE TID page (or another block of metadata) would remain in cache 202" may refer to subtracting a predetermined number from the age of the BE TID page or setting the initial value of the age to a negative value (as opposed to setting it to zero).

In another example, the cache 202 may be divided into buckets. Each bucket may be associated with a different respective minimal stay time. The minimal stay time for any of the buckets specifies the minimum amount of time for which the BE TID pages (or other BE metadata blocks) must remain in cache 202 before being removed. In this example, the phrase "extending the duration for which a given BE TID page (or another block of metadata) would remain in cache 202" may refer to placing the BE metadata in a bucket that has a longer minimal stay time. In this regard, in the context of step 1106 of process 1100, setting the duration for which BE metadata is stored in cache 202 based on a hint may include: (i) detecting whether the hint indicates that a write request is part of a sequential or random pattern, (ii) when the write request is part of a sequential pattern, storing BE metadata (e.g., a BE TID page) associated with the write request in a first bucket having a first minimal stay time, and (iii) when the write request is part of a random pattern, storing the BE metadata associated with the write request in a second bucket having a second minimal stay time that is shorter than the first minimal stay time. As noted above, the hint may indicate that a write request is part of a random pattern, when the sequence (obtained at step 912) is classified into the random pattern category (at step 914). Similarly, the hint may indicate that a write request is part of a sequential pattern, when the sequence (obtained at step 912) is classified into the sequential pattern category (at step 914).

The example above selects a bucket for a BE TID page based on the type of category into which a write request (or the sequence) is classified. However, in some implementations, the bucket selection may also be performed based on the subtype of the category of the write request (or sequence). For example, if the sequence is classified into the pure random subtype, a BE TID page may be placed in a third bucket that has a third minimal stay, and if the sequence is classified into the random with clusters subtype, the BE TID page may be placed in a fourth bucket that has longer minimal stay time than the third bucket.

The current disclosure is not limited to any specific caching method. The concepts and ideas presented in this document serve as examples of an infrastructure that can be integrated into a storage system to provide hints that can be used to enhance the performance of various caching algorithms. In many caching algorithms, hints may be one of several factors considered when deciding how long data should remain in the cache.

Figure 12:
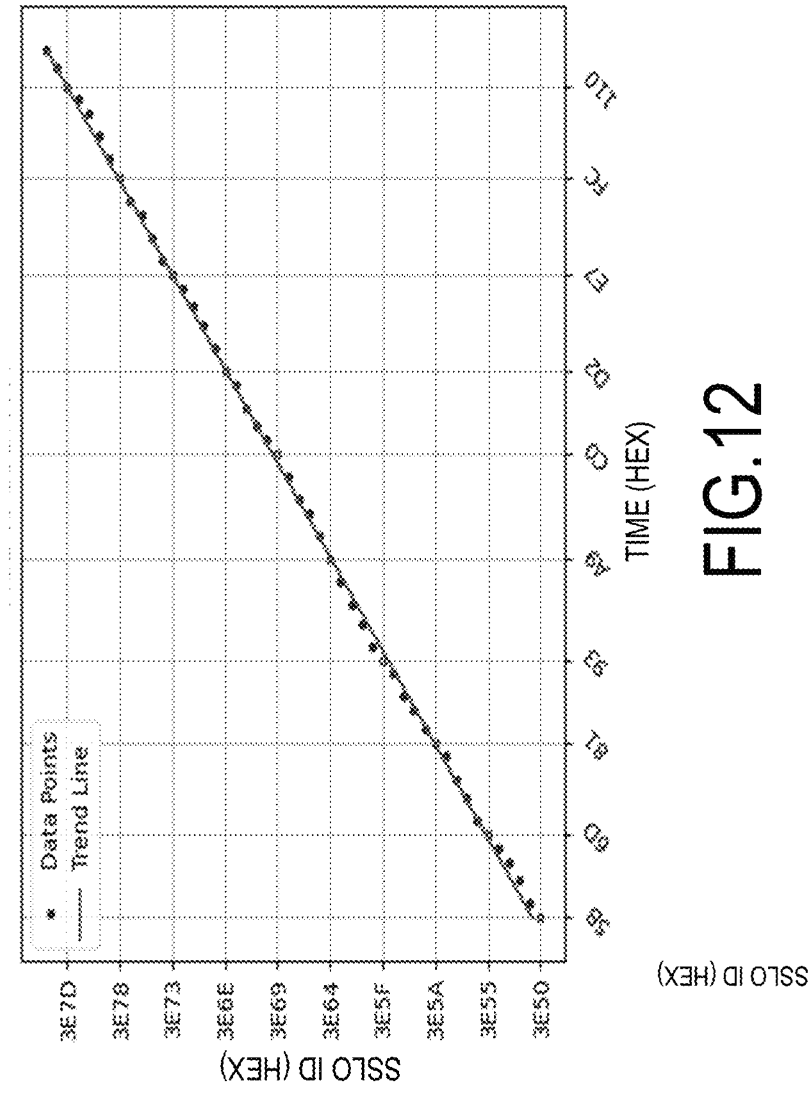
FIG. 12 is a graph illustrating aspects of the operation of the storage system of FIG. 2, according to aspects of the disclosure.
Figure 13:
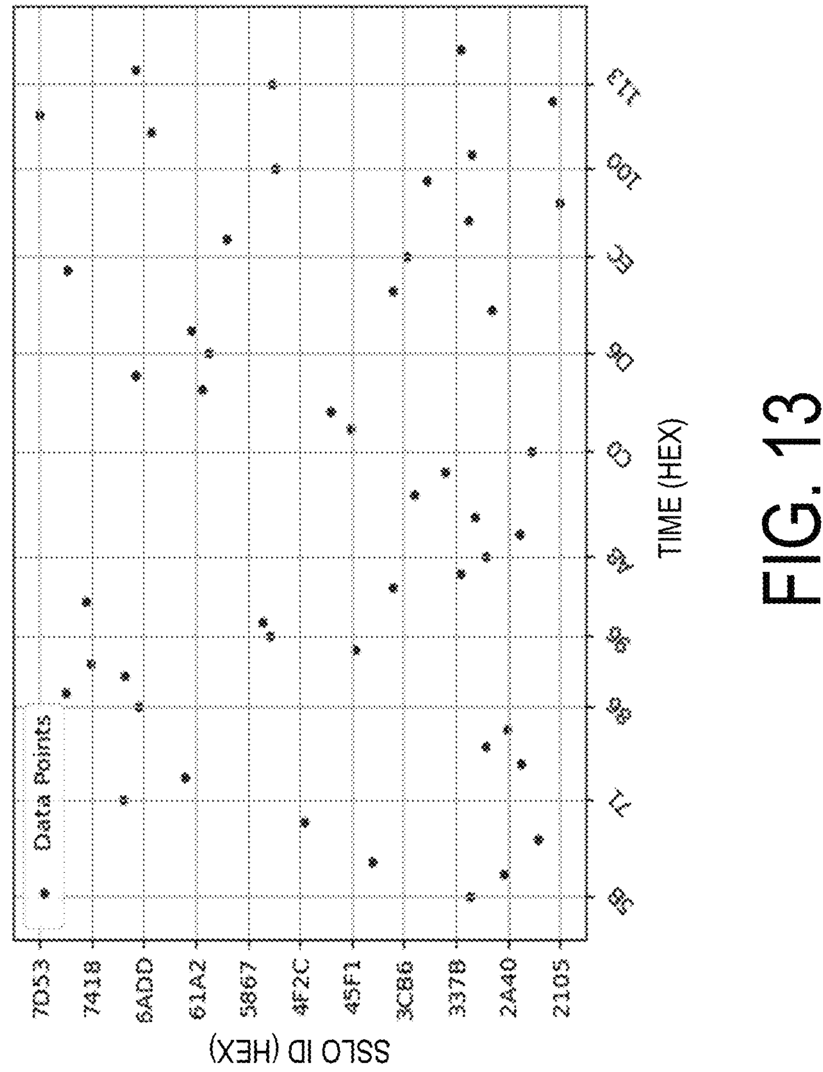
FIG. 13 is a graph illustrating aspects of the operation of the storage system of FIG. 2, according to aspects of the disclosure.

FIG. 12 is a plot of the IDs of SSLO objects versus the time the SSLO objects are removed from the aging queue 218. The plot illustrates a pattern that occurs when the write requests that are being destaged from the aging queue 218 are part of a sequential write pattern. The plot of FIG. 13 illustrates that when write requests are part of a sequential write pattern, a plot of their corresponding SSLO objects versus time can be fit to a straight line, whereby the Root Mean Square Error (RMSE) of the fitting is less than a predetermined threshold (e.g., 15%). The threshold may be application-specific, and the present disclosure is not limited to any particular threshold. It will be recalled that the values of write request addresses are proportional to the values of the IDs of FE tracks associated with the write requests, and the values of the FE track IDs are proportional to the IDs of SSLO objects that point to the FE tracks. Thus, although FIG. 12 shows a plot of SSLO object IDs versus time, a plot of the write request addresses associated with the SSLO objects (or their FE track IDs) would yield the same or similar pattern.

In some respects, extracting the set sequence of page object IDs, at step 912 of process 900, yields the same or similar information that is shown in the plot of FIG. 12. As discussed above, the elements in the set need not be arranged in a perfect order to be considered part of a sequential pattern. In this regard, a machine-learning model that is trained using various examples of perfect or imperfect sequential patterns can be used to classify the set as corresponding either random or sequential write pattern. The machine-learning model may be executed by pattern detector 232.

In the example of FIG. 9, page objects are stored in ring buffer 230, and the set extracted at step 912 includes ring buffer object IDs. However, in some implementations, SSLO objects may be stored in ring buffer 230 (in the sequence in which they are destaged from aging queue 218), and the set extracted at step 912 may include a set of SSLO object IDs. Additionally or alternatively, in some implementations, FE tracks may be stored in ring buffer 230 (in the sequence in which they are destaged from aging queue 218), and the set extracted at step 912 may include a set of FE track IDs. Additionally or alternatively, in some implementations, write request addresses may be stored in ring buffer 230 (in the sequence in which they are destaged from aging queue 218), and the set extracted at step 912 may include the write request addresses. In some implementations, storing an object in the ring buffer 230 may include storing a pointer or another identifier of the object, such as flipping the value of a corresponding bit in a bit mask. Although in the present example, a ring buffer is used, in alternative implementations another ordered data structure can be used that preserves information regarding the order in which data items are added to the data structure.

FIG. 13 is a plot of the addresses of SSLO objects versus the time the SSLO objects are removed from the aging queue 218. The plot illustrates a pattern that occurs when the write requests which are being destaged from the aging queue 218 are part of a random write pattern.

In some respects, the methodology described with respect to FIGS. 9-13 involves detecting whether a write request is part of a sequential write pattern and extending the stay in cache of a BE TID page that corresponds to the write request if the write request is part of a sequential write pattern. When a write request is being destaged, a BE metadata page may be retrieved into cache 202 by module 206. This BE metadata page may contain information related to the address of the write request, as well as to adjacent addresses. Since a write request that is part of a sequential write pattern is likely to be followed by write requests associated with these adjacent addresses, extending the time that the BE metadata remains in cache for sequential write requests is beneficial. This approach reduces the frequency with which the same BE TID page needs to be fetched into cache, thereby increasing the cache hit rate for cache 202.

The technique discussed in relation to FIGS. 9-13 results in efficient cache utilization in several ways. Specifically, it ensures that metadata associated with one-time batch processes is promptly removed, which frees up cache space for more critical and frequently accessed data. Additionally, by prioritizing cache resources for response-sensitive I/O operations, the technique enhances overall system responsiveness and performance.

Moreover, the approach discussed in relation to FIGS. 9-13 can refine Least Recently Used (LRU) scheduling by incorporating real-time I/O patterns and historical data, leading to more intelligent and effective cache management. As mentioned earlier, by improving prediction and the timely eviction of less critical metadata, the algorithm minimizes cache misses, thus enhancing data retrieval efficiency. Finally, by optimizing the timing and placement of metadata objects within the cache, the technique contributes to higher system throughput and better resource allocation.

FIGS. 1A-13 are provided as an example only. In some embodiments, the term "I/O request" or simply "I/O" may be used to refer to an input or output request. At least some of the steps discussed with respect to FIGS. 1-13 may be performed in a different order or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. The acronym RAID, as used throughout the disclosure, means "Redundant Array of Independent Disks". In the example of FIGS. 1A-13, storage system 133 is a content-addressable storage system. However, the concept and ideas presented throughout the specification can be applied to location-addressable storage systems and/or any other suitable type of storage system.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus. In the example of FIGS. 1A-13, storage system 133 is a content-addressable storage system. However, the concepts and ideas presented throughout the specification can be applied to location-addressable storage systems and/or any other suitable type of storage system.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage system, comprising:

placing a write request in an aging queue;

waiting until an age of the write request is greater than an aging time associated with the aging queue;

removing the write request from the aging queue and updating an ordered data structure to include an object that references the write request, the object having an object identifier (ID) that corresponds to an address that is associated with the write request;

retrieving a sequence of object IDs that correspond to objects in the ordered data structure;

classifying the sequence into one of at least a sequential pattern category and a random pattern category;

generating a hint indicating an outcome of the classification; and setting a duration for which backend (BE) metadata that corresponds to the write request would remain stored in a cache based on the hint.

2. The method of claim 1, wherein the object includes a page object, and updating the ordered data structure includes one of: (i) updating the page object to include a reference to the write request and adding the page object to the ordered data structure, or (ii) updating the page object to include a reference to the write request after the page object has been added to the ordered data structure.

3. The method of claim 2, wherein updating the page object to include a reference to the write request includes setting a value of a bit in a bit mask of the object.

4. The method of claim 1, wherein placing the write request in the aging queue includes placing in the aging queue a service-level symmetric link object (SSLO) that corresponds to the write request.

5. The method of claim 1, wherein the ordered data structure includes a ring buffer.

6. The method of claim 1, wherein setting the duration for which the BE metadata that corresponds to the write request would remain stored in the cache includes extending the duration when the hint indicates that the sequence has been classified into the sequential pattern category.

7. The method of claim 1, wherein setting the duration for which the BE metadata that corresponds to the write request would remain stored in the cache includes setting the duration to a first value when the hint indicates that the sequence has been classified into the sequential pattern category, and setting the duration to a second value when the hint indicates that the sequence has been classified into the random pattern category.

8. The method of claim 1, wherein the BE metadata that corresponds to the write request includes a BE metadata page that corresponds to a plurality of addresses, one of which is associated with the write request.

9. The method of claim 1, wherein the object includes a page object, and updating the ordered data structure includes one of: (i) updating the page object to include a reference to a service-level symmetric link object (SSLO) that corresponds to the write request and adding the page object to the ordered data structure, or (ii) updating the page object to include a reference to the write request after the page object has been added to the ordered data structure.

10. A system, comprising:

a memory; and at least one processor that is operatively coupled to the memory, the at least one processor being configured to perform the operations of:

placing a write request in an aging queue;

waiting until an age of the write request is greater than an aging time associated with the aging queue;

removing the write request from the aging queue and updating an ordered data structure to include an object that references the write request, the object having an object ID that corresponds to an address that is associated with the write request;

retrieving a sequence of object IDs that correspond to objects in the ordered data structure;

classifying the sequence into one of at least a sequential pattern category and a random pattern category;

generating a hint indicating an outcome of the classification; and setting a duration for which backend (BE) metadata that corresponds to the write request would remain stored in a cache based on the hint.

11. The system of claim 10, wherein the object includes a page object, and updating the ordered data structure includes one of: (i) updating the page object to include a reference to the write request and adding the page object to the ordered data structure, or (ii) updating the page object to include a reference to the write request after the page object has been added to the ordered data structure.

12. The system of claim 11, wherein updating the page object to include a reference to the write request includes setting a value of a bit in a bit mask of the object.

13. The system of claim 10, wherein placing the write request in the aging queue includes placing in the aging queue a service-level symmetric link object (SSLO) that corresponds to the write request.

14. The system of claim 10, wherein the ordered data structure includes a ring buffer.

15. The system of claim 10, wherein setting the duration for which the BE metadata that corresponds to the write request would remain stored in the cache includes extending the duration when the hint indicates that the sequence has been classified into the sequential pattern category.

16. The system of claim 10, wherein setting the duration for which the BE metadata that corresponds to the write request would remain stored in the cache includes setting the duration to a first value when the hint indicates that the sequence has been classified into the sequential pattern category, and setting the duration to a second value when the hint indicates that the sequence has been classified into the random pattern category.

17. The system of claim 10, wherein the BE metadata that corresponds to the write request includes a BE metadata page that corresponds to a plurality of addresses, one of which is associated with the write request.

18. The system of claim 10, wherein the object includes a page object, and updating the ordered data structure includes one of: (i) updating the page object to include a reference to a service-level symmetric link object (SSLO) that corresponds to the write request and adding the page object to the ordered data structure, or (ii) updating the page object to include a reference to the write request after the page object has been added to the ordered data structure.

19. A non-transitory computer-readable medium storing one or more processor-executable instructions, which, when executed by at least one processor, further cause the at least one processor to perform the operations of:

placing a write request in an aging queue;

waiting until an age of the write request is greater than an aging time associated with the aging queue;

removing the write request from the aging queue and updating an ordered data structure to include an object that references the write request, the object having an object ID that corresponds to an address that is associated with the write request;

retrieving a sequence of object IDs that correspond to objects in the ordered data structure;

classifying the sequence into one of at least a sequential pattern category and a random pattern category;

generating a hint indicating an outcome of the classification; and setting a duration for which backend (BE) metadata that corresponds to the write request would remain stored in a cache based on the hint.

20. The non-transitory computer-readable medium of claim 19, wherein the object includes a page object, and updating the ordered data structure includes one of: (i) updating the page object to include a reference to the write request and adding the page object to the ordered data structure, or (ii) updating the page object to include a reference to the write request after the page object has been added to the ordered data structure.

* * * * *